(12) United States Patent
Pettersson et al.

(10) Patent No.: US 10,136,153 B2
(45) Date of Patent: Nov. 20, 2018

(54) DRAP IDENTIFICATION AND DECODING

(71) Applicant: Telefonaktiebolaget L M Ericsson (publ), Stockholm (SE)

(72) Inventors: Martin Pettersson, Vallentuna (SE); Richard Mitic, Sundbyberg (SE); Jonatan Samuelsson, Stockholm (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 14/900,649

(22) PCT Filed: Nov. 24, 2015

(86) PCT No.: PCT/SE2015/051259
§ 371 (c)(1),
(2) Date: Dec. 22, 2015

(87) PCT Pub. No.: WO2016/126181
PCT Pub. Date: Aug. 11, 2016

(65) Prior Publication Data
US 2016/0373777 A1    Dec. 22, 2016

Related U.S. Application Data

(60) Provisional application No. 62/111,820, filed on Feb. 4, 2015.

(51) Int. Cl.
*H04N 19/46* (2014.01)
*H04N 19/105* (2014.01)
*H04N 19/159* (2014.01)
*H04N 19/172* (2014.01)
*H04N 19/593* (2014.01)
*H04N 19/70* (2014.01)
(Continued)

(52) U.S. Cl.
CPC ........... *H04N 19/46* (2014.11); *H04N 19/105* (2014.11); *H04N 19/107* (2014.11); *H04N 19/159* (2014.11); *H04N 19/172* (2014.11); *H04N 19/593* (2014.11); *H04N 19/70* (2014.11); *H04N 21/4383* (2013.01); *H04N 21/84* (2013.01); *H04N 21/845* (2013.01)

(58) Field of Classification Search
CPC .... H04N 19/46; H04N 19/105; H04N 19/107; H04N 19/159; H04N 19/172; H04N 19/593; H04N 19/70; H04N 21/4383; H04N 21/84; H04N 21/845
See application file for complete search history.

(56) References Cited

U.S. PATENT DOCUMENTS

2003/0163781 A1    8/2003    Visharam et al.
2010/0189182 A1    7/2010    Hannuksela
(Continued)

OTHER PUBLICATIONS

Pettersson et al., "HLS: Dependent RAP Indication SEI Message," JCT-VC, Sapproro, Japan, Jun./Jul. 2014.*
(Continued)

*Primary Examiner* — Thai Tran
*Assistant Examiner* — Christopher T Braniff
(74) *Attorney, Agent, or Firm* — Murphy, Bilak & Homiller, PLLC

(57) ABSTRACT

The proposed technology comprises identifying a DRAP sample and its associated IRAP sample in a media container file (1) comprising a bitstream of encoded video content in the form of encoded pictures.

31 Claims, 11 Drawing Sheets

(51) Int. Cl.
  *H04N 21/438* (2011.01)
  *H04N 21/84* (2011.01)
  *H04N 21/845* (2011.01)
  *H04N 19/107* (2014.01)

(56) References Cited

U.S. PATENT DOCUMENTS

| | | |
|---|---|---|
| 2013/0091251 A1 | 4/2013 | Walker et al. |
| 2014/0314148 A1 | 10/2014 | Lainema et al. |
| 2015/0264370 A1* | 9/2015 | Ramasubramonian ............ H04N 19/33 375/240.02 |
| 2016/0219273 A1 | 7/2016 | Pettersson et al. |

OTHER PUBLICATIONS

Pettersson, Martin et al., "HLS: Dependent RAP indication SEI message", Joint Collaborative Team on Video Coding (JCT-VC) of ITU-T SG 16 WP 3 and ISO/IEC JTC 1/SC 29/WG 11 18th Meeting: Sapporo, JP, Document R0059, Jun. 30-Jul. 9, 2014, 1-5.

Pettersson, Martin et al., "JCTVC-R0059: HLS: Dependent RAP Indication SEI Message", Ericsson, Jul. 3, 2014, 1-13.

Unknown, Author, "Information technology—Coding of audio-visual objects—Part 12: ISO base media file format", International Standard ISO/IEC 14496-12:2012, Dec. 15, 2015, 1-248.

Pettersson, Martin , et al., "HLS: Dependent RAP indication SEI message", Joint Collaborative Team on Video Coding (JCT-VC) of ITU-T SG 16 WP 3 and ISO/IEC JTC 1/SC 29/WG 11, Document: JCTVC-50095-v2, 19th Meeting: Strasbourg, FR, Oct. 17-24, 2014, 1-4.

Stockhammer, Thomas , "Streaming ISO File Format", Qualcomm Incorporated, ISO/IEC JTC1/SC29/WG11 MPEG2014/M35152, International Organisation for Standardisation, Coding of Moving Pictures and Audio, Strasbourg, France, Oct. 2014, 1-12.

Wang, Ye-Kui , "HEVC file format: On random access signalling", Qualcomm Incorporated, ISO/IEC JTC1/SC29/WG11 MPEG2013/M31212, International Organisation for Standardisation, Coding of Moving Pictures and Audio, Oct. 28-Nov. 1, 2013, 1-2.

* cited by examiner

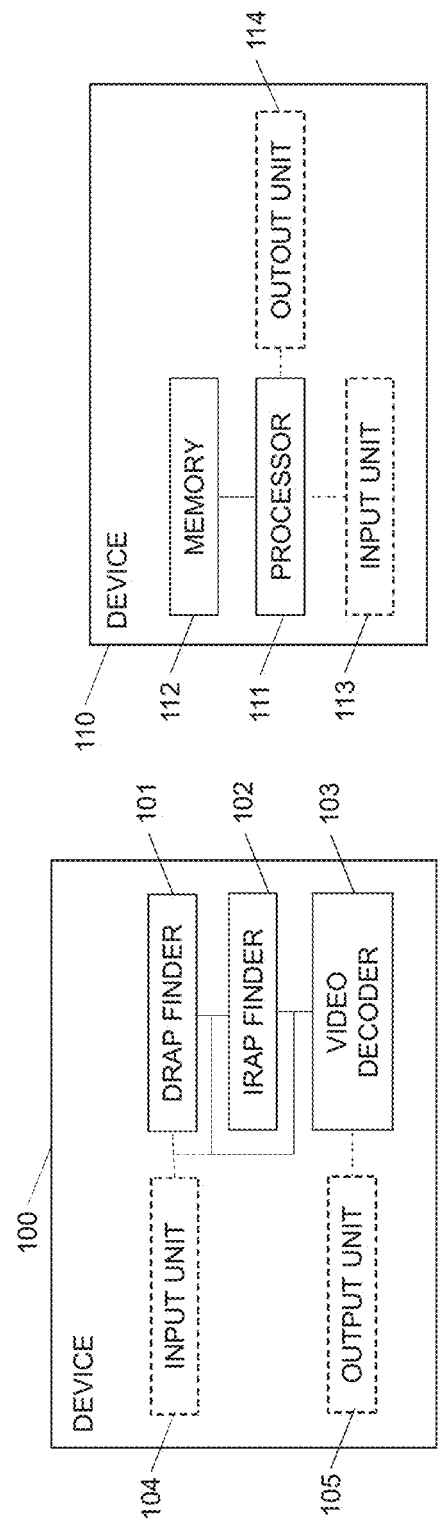

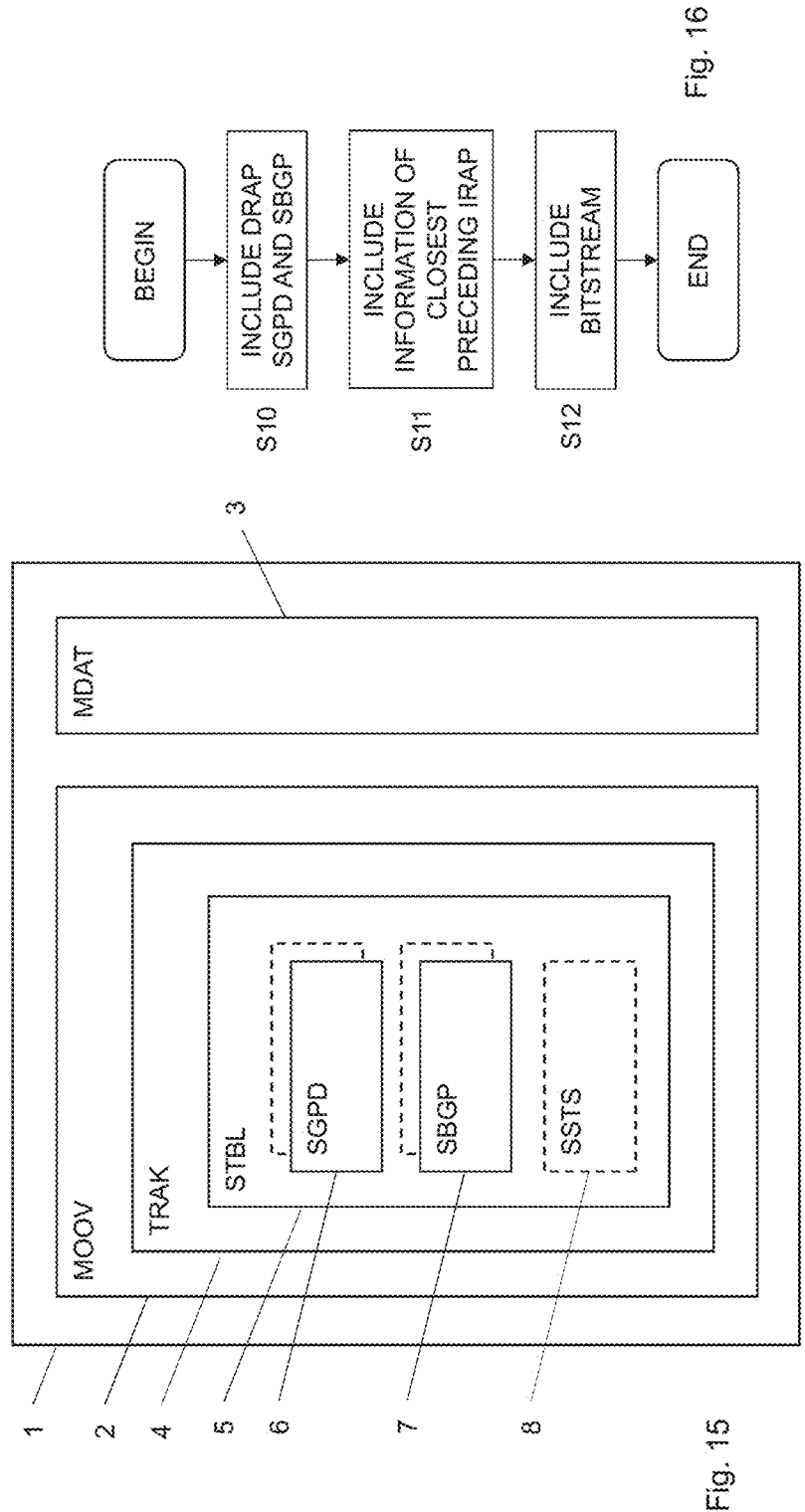

DRAP IDENTIFICATION AND DECODING

TECHNICAL FIELD

The present embodiments generally relate to bitstream or media container file processing, and in particular to processing of such bitstreams or media container files comprising dependent random access point (DRAP) pictures or samples.

BACKGROUND

The amount of video data sent over internet, broadcasted networks and mobile networks are increasing every year. This trend is pushed by the increased usage of over-the-top (OTT) services like Netflix, Hulu and YouTube as well as an increased demand for high quality video and a more flexible way of watching TV and other video services.

To keep up with the increasing bitrate demand for video it is important to have good video compression. Recently, JCT-VC in collaboration with MPEG developed the HEVC version 1 video codec (H.265), which efficiently cuts the bitrate in half for the same quality compared to its predecessor AVC/H.264.

HEVC and Random Access

HEVC is a block based video codec that utilizes both temporal and spatial prediction. Spatial prediction is achieved using intra (I) prediction from within the current picture. A picture consisting of only intra coded blocks is referred to as an I-picture. Temporal prediction is achieved using inter (P) or bi-directional inter (B) prediction on block level. In inter prediction, a prediction of a block is made from a previously decoded picture. In bi-directional inter prediction, the prediction of a block is made from one or two previously decoded pictures, which may come after in output order (display time). A picture containing at least one inter coded block but no bidirectional coded inter blocks is referred to as a P-picture. A picture containing at least one bidirectional inter block is referred to as a B-picture. Both P-pictures and B-pictures may also contain intra coded blocks. Intra coded blocks are typically much more expensive to encode than P-blocks, which are typically more expensive to encode than B-blocks.

An instantaneous decoding refresh (IDR) picture is an I-picture, for which a following picture may not reference a picture prior to the IDR picture. A clean random access (CRA) picture is an I-picture that allows a random access skipped leading (RASL) picture to reference a picture that precedes the CRA picture in output order and decoding order. In case the decoding starts at the CRA picture, the RASL picture must be dropped. Broken link access (BLA) pictures are I-pictures that are used for indicating splicing points in the bitstream. Bitstream splicing operations can be performed by changing the picture type of a CRA picture in a first bitstream to a BLA pictures and concatenating the stream at a proper position in the other bitstream.

An intra random access point (IRAP) picture may be any one of IDR, CRA or BLA picture. All IRAP pictures guarantee that pictures that follow the IRAP in both decoding and output order do not reference any picture prior to the IRAP picture in decoding order. The first picture of a bitstream must be an IRAP picture, but there may be many other IRAP pictures throughout the bitstream. IRAP pictures provide the possibility to tune in to a video bitstream, for example when starting to watch TV or switching from one TV channel to another. IRAP pictures can also be used for seeking in a video clip, for example by moving the play position using a control bar of a video player. Moreover, an IRAP picture provides a refresh of the video in case there are errors or losses in the video bitstream.

Video sequences are typically compressed using a fixed maximum picture distance between IRAP pictures. More frequent IRAP pictures make channel switching faster and increases the granularity of seeking in a video clip. This is balanced against the bit cost of IRAP pictures. Common IRAP picture intervals could vary between 0.5 to 1.0 seconds as illustrative examples.

One way of looking at the difference between IRAP and temporal predictive pictures is that the IRAP picture is like an independent still picture, while a temporal predictive picture is a dependent delta picture relative to previous pictures.

FIG. 1 shows an example video sequence where the first picture is an IRAP picture and the following pictures are P-pictures. The top row shows what is sent in the bitstream and the bottom row shows what the decoded pictures look like. As can be seen, the IRAP picture conveys a full picture while the P-pictures are delta pictures. Since the IRAP picture does not use temporal picture prediction, its compressed size is usually many times larger than a corresponding temporal predictive picture, which is shown as the number of bits for respective compressed picture in FIG. 1.

By looking at actual coded sequences one can get an indication of how much more bits that are spent on IRAP pictures as compared to P pictures. Let us look at the common conditions bitstreams for the HEVC codec that are provided by the JCT-VC standardizations group.

An estimation of the bit-rate savings achievable by converting every IRAP picture except the first to P picture for two sets of sequences is reported in Tables 1 and 2 for different values of the quantization parameter (QP).

TABLE 1

| | HEVC HM11.0 8b YUV 4:2:0 | | | | | |
|---|---|---|---|---|---|---|
| Sequence | Format | Fps | QP22 | QP27 | QP32 | QP37 |
| Kimono | 1920 × 1080 | 24 | −10.50% | −11.40% | −12.10% | −12.10% |
| Nebuta | 2560 × 1600 | 60 | −0.60% | −1.00% | −2.80% | −8.90% |
| ParkScene | 1920 × 1080 | 24 | −13.70% | −20.40% | −25.80% | −29.30% |
| PartyScene | 832 × 480 | 50 | −6.60% | −10.30% | −14.80% | −19.60% |
| PeopleOnStreet | 2560 × 1600 | 30 | −2.50% | −3.80% | −4.30% | −4.40% |
| RaceHorses | 416 × 240 | 30 | −4.00% | −5.80% | −6.70% | −7.70% |
| RaceHorses | 832 × 480 | 30 | −2.50% | −4.30% | −6.50% | −8.40% |
| SlideEditing | 1280 × 720 | 30 | −56.50% | −57.70% | −57.60% | −59.90% |
| SlideShow | 1280 × 720 | 20 | −14.80% | −17.20% | −20.50% | −20.30% |
| SteamLocomotive | 2560 × 1600 | 60 | −2.60% | −5.00% | −7.80% | −10.40% |
| Traffic | 2560 × 1600 | 30 | −12.80% | −21.90% | −28.90% | −33.90% |
| Average | | | −11.55% | −14.44% | −17.07% | −19.54% |

TABLE 2

| | SCC HM14.0 8b YUV 4:4:4 | | | | | |
|---|---|---|---|---|---|---|
| Sequence | Format | Fps | QP22 | QP27 | QP32 | QP37 |
| Basketball_Screen | 2560 × 1440 | 60 | −26.30% | −34.00% | −40.10% | −44.80% |
| EBURainFruits | 1920 × 1080 | 50 | −8.90% | −12.30% | −14.90% | −17.10% |
| Kimono | 1920 × 1080 | 24 | −3.80% | −4.20% | −4.40% | −5.90% |
| MissionControlClip2 | 2560 × 1440 | 60 | −5.70% | −7.10% | −8.70% | −9.30% |
| MissionControlClip3 | 1920 × 1080 | 60 | −7.20% | −8.70% | −11.50% | −17.10% |
| sc_console | 1920 × 1080 | 60 | −4.10% | −4.40% | −5.10% | −5.50% |
| sc_desktop | 1920 × 1080 | 60 | −32.70% | −31.40% | −29.80% | −28.10% |
| sc_flyingGraphics | 1920 × 1080 | 60 | −0.60% | −0.80% | −1.40% | −2.10% |
| sc_map | 1280 × 720 | 60 | −10.10% | −10.70% | −10.30% | −13.00% |
| sc_programming | 1280 × 720 | 60 | −3.60% | −5.20% | −8.40% | −13.00% |
| sc_robot | 1280 × 720 | 30 | −13.40% | −21.20% | −27.20% | −31.30% |
| sc_slideshow | 1280 × 720 | 20 | −16.10% | −18.10% | −20.10% | −19.10% |
| sc_web_browsing | 1280 × 720 | 30 | −14.20% | −17.00% | −20.40% | −19.70% |
| Average | | | −11.28% | −13.47% | −15.56% | −17.38% |

DRAP

IRAP pictures can be used in HEVC to enable random access operations and to refresh the video in case of errors. The functionality of IRAP pictures comes with a cost since intra pictures typically are significantly more expensive to encode in terms of number of bits as compared to P- or B-pictures. Dependent RAP (DRAP) pictures have therefore been proposed [1] for HEVC. When performing random access at a DRAP picture, the associated IRAP picture must first be decoded. It is asserted that DRAP pictures may be used to improve the compression efficiency for random access coded video, especially for video services that often have very static content including screen sharing and surveillance video.

Recovery Point SEI

In HEVC, as well as in AVC/H.264, there is a Supplemental Enhancement Information (SEI) message called Recovery Point SEI. The recovery point SEI message assists a decoder in determining when the decoding process will produce acceptable pictures for display after the decoder initiates random access or after the encoder indicates a broken link in the bitstream. When the decoding process is started with the picture in decoding order associated with the recovery point SEI message, all decoded pictures at or subsequent to the recovery point in output order specified in this SEI message are indicated to be correct or approximately correct in content.

ISO Base Media File Format (ISOBMFF)

The ISO base media file format defines a general structure for time-based media files, such as video and audio. It is used as the basis for other media file formats, e.g. container formats MPEG-4 Part 14 (MP4) and 3GPP file format (3GP).

It is designed as a flexible, extensible format that allows editing and presentation of the media. The presentation may be local, or via a network or other stream delivery mechanism including Real-time Transport Protocol (RTP) and MPEG Dynamic Adaptive Streaming over HTTP (MPEG-DASH).

A sync sample, e.g. ISOBMFF sync sample, is a sample at which decoding may start, and at which no subsequent samples in decoding order are referenced by any samples preceding the sync sample.

A random access point (RAP) sample, e.g. ISOBMFF RAP sample, is similar to a sync sample, except it allows samples after the RAP to be referenced by samples before it. A sync sample is also a RAP sample.

SUMMARY

There is a problem with existing solutions to seek in a media container file comprising dependent random access point (DRAP) samples. Prior art solutions do not describe how to perform an efficient random access at an arbitrary point through usage of such DRAP samples.

The proposed technology comprises identifying a DRAP sample and its associated IRAP sample in a bitstream of encoded pictures when such a bitstream is encapsulated in a media container file.

The proposed technology also comprises introducing DRAP functionality to media container files.

An aspect of the embodiments relates to a method for decoding DRAP samples. The method comprises finding a DRAP sample in a media container file comprising a bitstream of encoded video content in the form of encoded pictures. The method also comprises finding a closest preceding, according to a decoding order, IRAP sample in the media container file. The method further comprises decoding the IRAP sample and decoding the DRAP sample with the decoded IRAP sample as reference sample.

A related aspect of the embodiments defines a device for decoding DRAP samples. The device is configured to find a DRAP sample in a media container file comprising a bitstream of encoded video content in the form of encoded pictures. The device is also configured to find a closest preceding, according to a decoding order, IRAP sample in the media container file. The device is further configured to decode the IRAP sample and decode the DRAP sample with the decoded IRAP sample as reference sample.

Another related aspect of the embodiments defines a device for decoding DRAP samples. The device comprises a DRAP finder for finding a DRAP sample in a media container file comprising a bitstream of encoded video content in the form of encoded pictures. The device also comprises an IRAP finder for finding a closest preceding, according to a decoding order, IRAP sample in the media container file. The device further comprises a video decoder for decoding the IRAP sample and decoding the DRAP sample with the decoded IRAP sample as reference sample.

Another aspect of the embodiments relates to a method of generating a media container file. The method comprises including a sample group description and/or a sample group with grouping type 'drap' comprising information identifying a position of a DRAP sample within a bitstream of encoded video content in the form of encoded pictures comprised in the media container file. The method also comprises including information in the media container file of a closest preceding IRAP sample within the bitstream given a position of the DRAP sample in the bitstream. The information enables identification of the closest preceding IRAP sample within the bitstream and the closest preceding IRAP sample is a reference sample for the DRAP sample. The method further comprises including the bitstream in the media container file.

A related aspect of the embodiments defines to a device for generating a media container file. The device is configured to include a sample group description and/or a sample group with grouping type 'drap' comprising information identifying a position of a DRAP sample within a bitstream of encoded video content in the form of encoded pictures comprised in the media container file. The device is also configured to include information in the media container file of a closest preceding IRAP sample within the bitstream given a position of the DRAP sample in the bitstream. The information enables identification of the closest preceding IRAP sample within the bitstream and the closest preceding IRAP sample is a reference sample for the DRAP sample. The device is further configured to include the bitstream in the media container file.

Another related aspect of the embodiments defines to a device for generating a media container file. The device comprises a group including unit for including a sample group description and/or a sample group with grouping type 'drap' comprising information identifying a position of a DRAP sample within a bitstream of encoded video content in the form of encoded pictures comprised in the media container file. The device also comprises an information including unit for including information in the media container file of a closest preceding IRAP sample within the bitstream given a position of the DRAP sample in the bitstream. The information enables identification of the closest preceding IRAP sample within the bitstream and the closest preceding IRAP sample is a reference sample for the DRAP sample. The device further comprises a bitstream including unit for including the bitstream in the media container file.

A further aspect of the embodiments relates to a media container file. The media container file comprises a movie box comprising metadata of a presentation. The media container file also comprises at least one media data box comprising a bitstream of encoded video content in the form of encoded pictures. The media container file further comprises a sample table box comprising metadata related to samples in the media container file. The sample table box comprises a sample group description box with grouping type equal to 'drap' and a sample group box with grouping type equal to 'drap'. The sample group description box with grouping type equal to 'drap' and the sample group box with grouping type equal to 'drap' comprise information allowing identification of one or more DRAP samples in the bitstream contained in the at least one media data box. The media container file additionally comprises information allowing identification of a closest preceding IRAP sample in the bitstream given a position of a DRAP sample in the bitstream. The position of the DRAP sample in the bitstream is defined based on the information comprised in the sample group description box with grouping type equal to 'drap' and the sample group box with grouping type equal to 'drap'.

Yet another aspect of the embodiments relates to a computer program comprising instructions, which when executed by a processor cause the processor to find a DRAP sample in a media container file comprising a bitstream of encoded video content in the form of encoded pictures. The processor is also caused to find a closest preceding, according to a decoding order, IRAP sample in the media container file. The processor is further caused to decode the IRAP sample and decode the DRAP sample with the decoded IRAP sample as reference sample.

An additional aspect of the embodiments relates to a computer program comprising instructions, which when executed by a processor cause the processor to include a sample group description and/or a sample group with grouping type 'drap' comprising information identifying a position of a DRAP sample within a bitstream of encoded video content in the form of encoded pictures comprised in the media container file. The processor is also caused to include information in the media container file of a closest preceding IRAP sample within the bitstream given a position of the DRAP sample in the bitstream. The information enables identification of the closest preceding IRAP sample within the bitstream and the closest preceding IRAP sample is a reference sample for the DRAP sample. The processor is further caused to include the bitstream in the media container file.

A related aspect of the embodiments defines a carrier comprising a computer program as defined above. The carrier is one of an electric signal, an optical signal, an electromagnetic signal, a magnetic signal, an electric signal, a radio signal, a microwave signal, or a computer-readable storage medium.

An advantage of the proposed solution is that DRAP samples can be located and used for random access without the need for parsing the entire bitstream or a major portion thereof in order to detect their positions.

BRIEF DESCRIPTION OF THE DRAWINGS

The embodiments, together with further objects and advantages thereof, may best be understood by making reference to the following description taken together with the accompanying drawings, in which:

FIG. 9 is a schematic block diagram of a device for decoding DRAP samples according to an embodiment.

FIG. 10 is a schematic block diagram of a device for decoding DRAP samples according to another embodiment.

FIG. 15 is a schematic overview a media container file according to an embodiment.

FIG. 16 is a flow chart illustrating an embodiment of a method of generating a media container file.

DETAILED DESCRIPTION

Embodiments as disclosed herein provide a technology for enabling identification of so-called dependent random access point (DRAP) pictures or samples and their associated IRAP pictures or samples, for example in the case that the encoded bitstream is encapsulated in a media container file.

The technology for identifying the DRAPs, preferably comprises inspecting a list or table that contains direct or indirect pointers to the locations of the DRAPs.

DRAP

IRAP pictures can be used in HEVC to enable random access operations and to refresh the video in case of errors. The functionality of IRAP pictures comes at a cost as intra pictures are typically significantly more expensive to encode in terms of bits compared to P- or B-pictures. For video with stationary content the relative cost of coding IRAP pictures is very expensive.

In broadcasting services, IRAP pictures are typically sent at frequent intervals, e.g. once per second, to enable reasonable channel switching times. Having even more frequent IRAP pictures would be desirable for decreasing the channel switching time even further, but that is not feasible since the IRAP pictures then would consume a large portion of the available bitrate and reduce the overall quality.

A DRAP picture is introduced in order to solve these problems. The presence and properties of a DRAP picture may be indicated by a dependent RAP indication SEI message.

Figure 1:
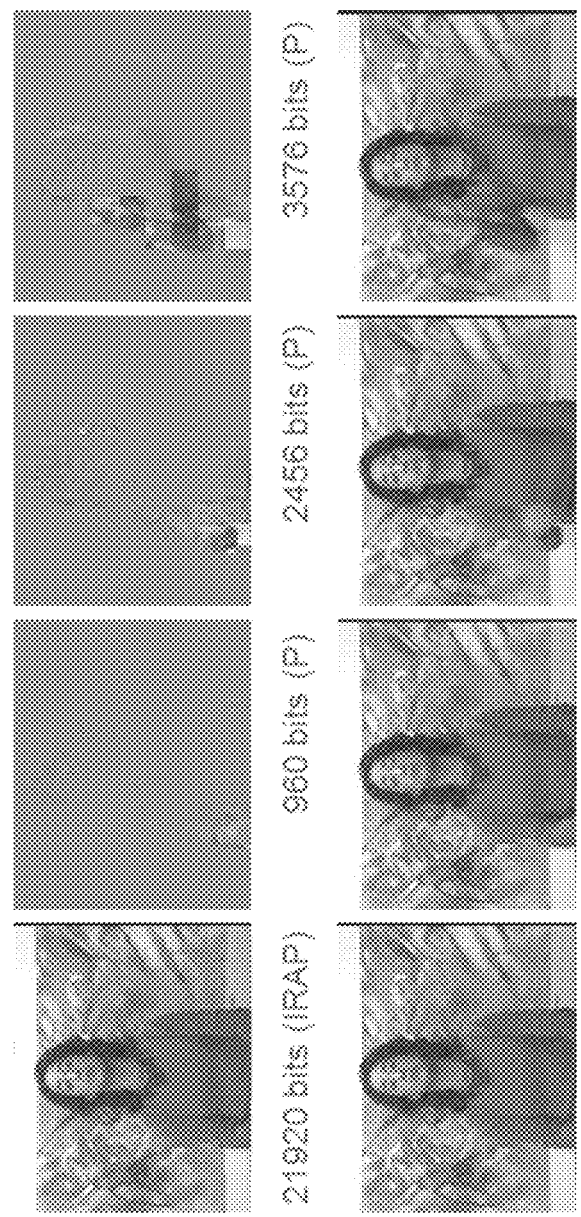
FIG. 1 illustrate an IRAP picture and P-pictures together with the number of bits required to encode the respective picture.
Figure 2:
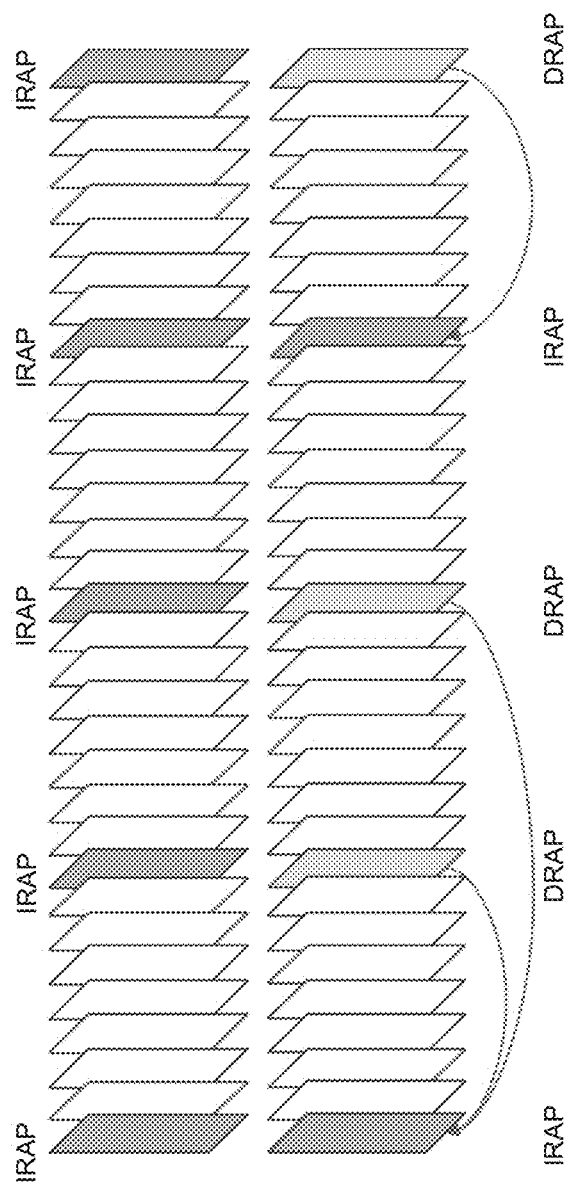
FIG. 2 illustrates, at the top, random access configuration with IRAP pictures and, at the bottom, random access configuration with both IRAP and DRAP pictures. The dark gray images are IRAP pictures, the medium gray pictures are DRAP pictures and the white pictures are either P- or B-pictures.

A DRAP picture in HEVC is a TRAIL_R picture with temporal id 0 and layer id 0 with the restriction that it may only reference the associated IRAP picture. In order to decode a DRAP picture in a random access operation its associated IRAP picture must first be decoded. A random access configuration with IRAP pictures and a random access configuration with both IRAP and DRAP pictures are illustrated in FIG. 2.

The HEVC specification already contains the related recovery point SEI message that may be used for indicating the possibility for random access. However, recovery point SEI messages cannot be used to realize the functionality of DRAP pictures. If a recovery point SEI message is sent together with the associated IRAP picture then all pictures that follow it in decoding order must be decoded up until the DRAP picture, which is not desirable. And the recovery point SEI message cannot be sent together with the DRAP picture since it is not possible to indicate dependency on anything that precedes the recovery point SEI message in decoding order.

Figure 3:
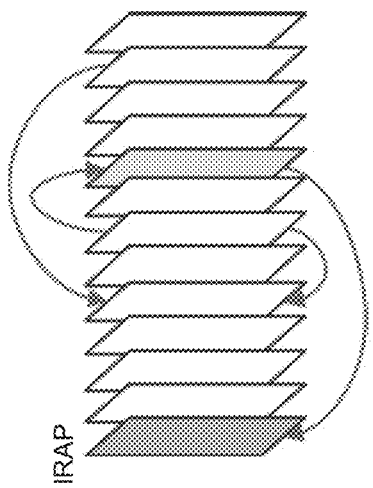
FIG. 3 illustrates that it is not possible to derive the DRAP functionality by only parsing the reference picture set (RPS). A picture following the DRAP picture in decoding order may still reference a non-IRAP picture preceding the DRAP picture.

The dependent RAP indication SEI message ensures that the bitstream complies with the DRAP functionality of the associated DRAP picture. It could be argued that it is possible to parse the reference picture set (RPS) to get the functionality of DRAP pictures. However, as depicted in FIG. 3, if DRAP pictures are not explicitly indicated it would not be possible to know in advance whether a picture following a DRAP picture in decoding order is referencing a non-IRAP picture preceding the DRAP picture in decoding order or not. This could result in erroneous pictures when performing a random access operation at a picture thought of being a DRAP picture. Moreover, parsing the RPS is a complex task and it would be desirable at a system layer to get the DRAP indication directly.

Video services that often have very static content include screen sharing and surveillance video. Screen sharing could for instance be used as a live communication tool between individuals or could be set up to monitor other computers, such as servers. For these services it is often of interest to store the video material. The stored video material should then preferably be easy to search using random access operations. At the same time it is of interest to keep the video bitrate at a minimum, both to limit the bandwidth usage and to save storage space. By using DRAP pictures with a shorter periodicity and IRAP pictures with a longer periodicity, for instance DRAP pictures every second and IRAP pictures every 60 seconds, the bitrate can be reduced at the same time as the stored video can be easily searched.

Another use case for DRAP pictures is fast channel switching in broadcast services. Assume that an end user is watching a first channel. Then by having multiple tuners in the receiver that buffers IRAP pictures from other channels, a channel switch can be performed at the first DRAP picture that occurs after the user has selected to switch channel. It is asserted that DRAP pictures can be sent much more frequently than IRAP pictures without affecting the overall quality as much.

Figure 4:
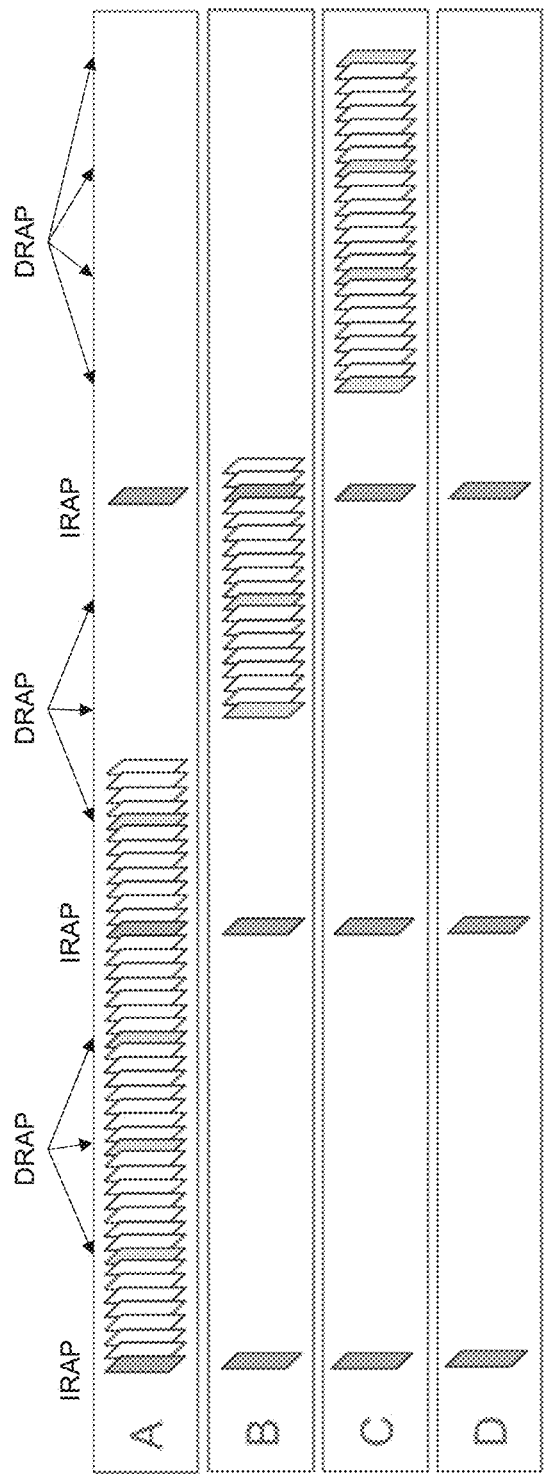
FIG. 4 schematically illustrates an example of channel switching using DRAP pictures. Dark gray pictures are IRAP pictures, medium gray pictures are DRAP pictures and white pictures are other temporal predictive pictures.

An example of channel switching using DRAP pictures is shown in FIG. 4. A user is watching channel A. Additional tuners receive and buffer the latest IRAP picture for channel B, C and D, e.g. the channels directly before and after channel A. At picture position 45 the user is switching to channel B. The channel B tuner waits 4 pictures for the next DRAP picture before the decoder can start to decode channel B with help from the buffered IRAP picture. At picture position 67 the user is switching to channel C. The decoder waits 6 pictures for the next DRAP picture before it can start to decode channel C. The latest IRAP picture is used to decode the DRAP picture. If the streams would not contain any DRAP pictures, the decoder would need to wait for the next IRAP picture before starting decoding after a channel switch. In the example below, the decoder would need to wait 20 pictures when switching between channels A and B and 30 pictures when switching between channels B and C. Also, the IRAP picture is larger than the DRAP picture, which also may contribute to longer delay.

The DRAP SEI message may be introduced. It is an empty SEI message that can be used for indicating that a picture is a DRAP picture meaning that it only references the closest preceding IRAP picture and that no picture that follows the DRAP picture in output order references anything that precedes the DRAP picture in output order except for the preceding IRAP picture.

The DRAP SEI message is specified as follows in the HEVC specification:

Dependent RAP Indication SEI Message Syntax

| dependent_rap_indication( payloadSize ) { | Descriptor |
|---|---|
| } | |

Dependent RAP Indication SEI Message Semantics

The dependent RAP indication SEI message assists a decoder in determining what parts of a bitstream need to be decoded in order to achieve correct decoding of the picture associated with the dependent RAP indication SEI message and the following pictures.

The picture associated with the dependent RAP indication SEI message is referred to as a DRAP picture. The DRAP picture shall be a TRAIL_R picture with TemporalId equal to 0 and nuh_layer_id equal to 0. The DRAP picture may not include any picture in RefPicSetStCurrBefore, RefPicSetStCurrAfter, or RefPicSetLtCurr except its associated IRAP picture.

When performing random access at the DRAP picture the value of pic_output_flag should be inferred to be equal to 0 for all pictures that precede the DRAP picture in output order. Decoded pictures preceding the DRAP picture in output order may contain references to pictures that are unavailable in the decoded picture buffer.

Any picture that follows the DRAP picture in output order and decoding order shall not include, in its RPS, any picture that precedes the DRAP picture in output order or decoding order with the exception of the IRAP picture associated with the DRAP picture.

In the following, various embodiments of the proposed technology are disclosed. These embodiments may be applied to a video specification or codec, such as HEVC and various extensions and variants thereof, and to the file format specification, such as ISOBMFF and various extensions and variants thereof. In the former case, i.e. video encoding and decoding, a DRAP functionality is typically in the form of a DRAP picture whereas in the latter case, i.e. file format, a DRAP functionality is typically in the form of a DRAP sample. As a consequence, the various embodiments may be adopted or modified slightly to either relate to video encoding and decoding, in which case DRAP pictures are used, or to file format, in which case DRAP samples are used.

In general, a media container file comprises media data, such as video content, and metadata that are enclosed in separate boxes, the media data ('mdat') box and the movie ('moov') box, respectively. The movie box typically comprises one or more tracks, with each track residing in a track box. There are various types of tracks, such as media tracks and metadata tracks. A media track refers to samples formatted, such as encoded, according to a media compression or coding format. A metadata track refers to samples describing referred media samples. For the presentation of a media type, typically one media track is selected. Samples of a track are implicitly associated with sample numbers that are incremented by 1 in the indicated decoding order of samples. Hence, encoded video content may be arranged as multiple samples in a media container file. The encoded video content and the samples are defined by at least one media track in the media container file.

It is noted that the ISOBMFF does not limit a presentation to be contained in one file, but it may be contained in several files.

Embodiment 1

DRAP Sample Group

In a first embodiment a list or a table is present indicating which pictures or samples are DRAP pictures or samples.

This can for example be realized through adding a new sample group to an ISOBMFF specification that will hold the information about which samples are DRAP samples. A sample group is a partition of samples within a media track, which fit a grouping criterion. In practice it may be manifested as a description of the group, plus a run-length-encoded table or list defining which samples belong to the group.

Figure 5:
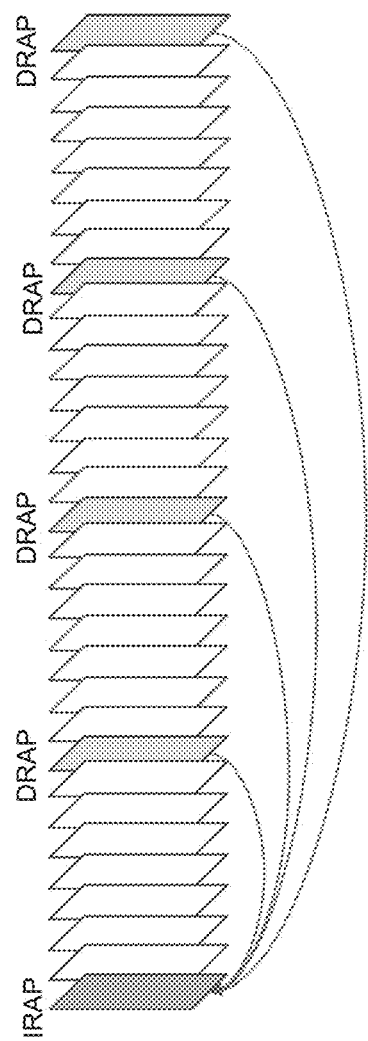
FIG. 5 illustrates an example prediction structure when DRAP pictures are used. The DRAP pictures may only reference the IRAP picture.

FIG. 5 illustrates an example prediction structure when DRAP pictures are used. The DRAP pictures may only reference the IRAP picture.

The following procedure can be performed to access a stream at a DRAP:

1. Inspect the DRAP sample group to find an access point close to the desired position.
2. Find and extract the immediately preceding IRAP sample by one or more of the following:
   a. Inspect the RAP sample group.
   b. Inspect the 'stss' (sync sample table) box.
   c. Inspect the current or previous 'trun' (track fragment run) box(es) to find an IRAP sample.
3. Decode the IRAP sample.
4. Decode the DRAP sample.

In an embodiment, step a. comprises inspecting the RAP sample group, which is a run-length-encoded table or list in the ISOBMFF specifying which samples are random access points, e.g. IRAP samples.

In an embodiment, step b. comprises inspecting the 'stss' box, which is an ISOBMFF structure giving the indexes of the sync samples within the media presentation.

In an embodiment of step c., the 'trun' box will either specify a set of flags for each sample, or if none are present, will implicitly assign a set of default flags which are specified in the movie header to all samples. It may optionally provide a separate set of flags for the first sample in the track fragment. These flags will indicate whether a sample is an IRAP or not.

In an embodiment, step 1. comprises inspecting a DRAP sample group, which is a run-length encoded table or list in the ISOBMFF specifying which samples are DRAP samples.

The desired access position may be at a DRAP, before a DRAP or after a DRAP. In case the IRAP sample is closer to the desired position than the DRAP sample, the stream may of course be accessed directly at the IRAP sample position.

If the file is segmented into many separate files, e.g. for MPEG-DASH ISOBMFF Live profile, the necessary IRAP sample may appear in a separate segment from the DRAP. These individual segment files are technically non-conformant, but as per the MPEG DASH specification, the concatenation of one or many media segment(s) with the initialization segment results in a conformant file. In this case it is assumed that both the segment containing the IRAP sample and the segment containing the DRAP sample have been concatenated with the initialization segment so that both the file and the contained bitstream are conformant. The DRAP may then be decoded using the method described above.

Embodiment 2

Picture Type Table

In a second embodiment, the picture types of the different pictures (or some properties of the pictures) are present in a table or list. In this table, the DRAP pictures or samples would be marked as DRAP and IRAP pictures or samples would be marked as IRAP.

The following method can be performed according to access a stream at a DRAP:
1. Inspect the table to find a DRAP picture or sample point close to the desired position.
2. Inspect the table to find the immediately preceding IRAP picture or sample.
3. Decode the IRAP picture or sample.
4. Decode the DRAP picture to sample.

The desired access position may be at a DRAP, before a DRAP or after a DRAP.

In an implementation of this embodiment, the DRAP picture or sample would be directly mapped with the associated IRAP picture or sample. Table 3 below shows an example of how this could look like.

TABLE 3 example of mapping DRAP to IRAP

| Sample entry | RAP sample pointer | Associated IRAP sample entry |
|---|---|---|
| 0 | 0 | — |
| 8 | 2455 | 0 |
| 16 | 3567 | 0 |
| 24 | 5678 | 0 |
| 32 | 7899 | — |
| 40 | 9866 | 32 |
| 48 | 11342 | 32 |

Table 3 illustrates an example of mapping DRAP to IRAP using a table. IRAPs are present at sample entries 0 and 32. The other entries are DRAPs, i.e. sample entries 18, 16, 24, 40 and 48. In an embodiment, the RAP sample pointer indicates a byte position in a media track of the media container file and where the media track comprises the encoded video content.

Embodiment 3

Picture Types Exposed in Packet Headers

In a third embodiment the DRAP picture information is exposed in a packet header, such as in the Real-time Transport Protocol (RTP) payload header. A receiver can then examine the packet headers in an RTP stream to identify, which packets are DRAP pictures and which pictures are IRAP pictures.

Embodiment 4

DRAP in RAP Sample Group or 'Stss' Box Using DRAPs in ISO Base Media File Format Standard in a Controlled Environment without Altering the Standard In a fourth embodiment, DRAP pictures and IRAP pictures are both present in the RAP sample group or 'stss' box described in the first embodiment. It is assumed that the RAP sample locator knows that the RAP sample group or 'stss' box may contain DRAP pictures.

The following method can be performed to access a stream at a RAP when DRAP pictures or samples may be present.
1. Inspect the RAP sample group or 'stss' box to find a RAP sample point close to the desired position.
2. Inspect the RAP sample to see whether it is an IRAP or a DRAP, e.g. by checking for a DRAP SEI message or identifying picture type.
3. If the RAP sample is a DRAP:
    a. Inspect the RAP sample group to find the immediately preceding IRAP sample according to previous steps.
    b. Decode the IRAP sample.
4. Decode the RAP sample.

Step 4. preferably comprises decoding the DRAP sample if the RAP is determined to be a DRAP sample in step 3. Correspondingly step 4. preferably comprises decoding the IRAP sample if the RAP sample is determined not to be a DRAP sample in step 3. and therefore instead is an IRAP sample.

In an embodiment, picture type is written in the bitstream. Hence, a sample may be extracted from the media track or a bitstream by a file parser and the picture type information can be read from the extracted sample.

In an embodiment, step a. comprises identifying the previous entry indicated as an IRAP sample in the RAP sample group. For instance, the RAP samples belonging to the RAP sample group could be indicated in a run-length-encoded list.

The desired position may be at a DRAP, before a DRAP or after a DRAP.

Embodiment 5

Random access can be performed in an MPEG-4 file through finding a sample that is included in the sync sample table or the Random Access Point (RAP) sample group, or in the case of a fragmented file by inspecting the sample flags given in the track run box(es). Such samples are in the present embodiment denoted RAP samples. When seeking to a certain position X in a file, a file parser would typically locate the closest preceding RAP sample and decode all samples starting from there until it reaches position X.

When the distance between RAP samples is large, the accuracy of the seeking operation will be low since the samples between the RAP sample and position X needs to be decoded in order to reach X. However, HEVC and AVC both allow for flexible reference picture selection schemes. It is possible for a picture to only reference a picture that occurred several steps in the past. This embodiment proposes to add an indication for a Dependent Random Access Point (DRAP) that can be used for getting quicker access to a desired position X, by not having to decode all samples in between X and the preceding RAP sample.

A DRAP is a sample after which all samples in decoding order can be correctly decoded if the closest RAP sample preceding the dependent random access point is available for reference.

Figure 6:
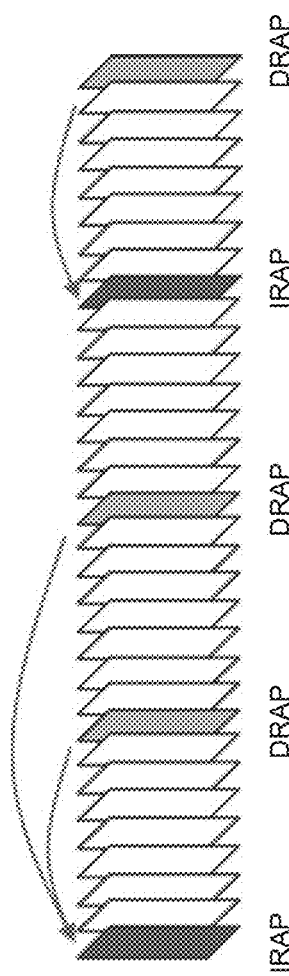
FIG. 6 illustrates an example prediction structure when DRAP pictures are used.

In HEVC a DRAP picture is a normal P- or B-picture (NAL unit type equal to TRAIL_R), which is restricted to depend only on the previous Intra Random Access Point (IRAP) picture, see FIG. 6. It allows frequent and simple random-access points without using frequent I-pictures and hence keeping the bit rate down.

The HEVC specification defines an SEI message, which would be present before a DRAP in the bitstream. While it has only been standardized in HEVC, the concept can equally be applied to other video codecs, such as AVC.

Example use by a parser:

A file parser could take the following steps to access a stream at a DRAP.

1. Inspect the DRAP sample group to find an access point close the desired position.
2. Find and extract the immediately preceding IRAP sample by one of the following:
   a. Inspect the RAP sample group.
   b. Inspect the 'stss' box.
   c. Inspect the current or previous 'trun' box(es) to find an IRAP sample.
3. Decode the IRAP sample.
4. Decode the DRAP sample.

Dependent Random Access Point (DRAP) Sample Grouping

Definition

Sync samples and samples that are included in the Random Access Point sample group can collectively be referred to as RAP samples or SAP samples.

A Dependent Random Access Point (DRAP) sample is a sample after which all samples in decoding order can be correctly decoded if the closest RAP or SAP sample preceding the DRAP sample is available for reference.

For example, if the $32^{nd}$ sample in a file is a RAP or SAP sample consisting of an I-picture, the $48^{th}$ sample may consist of a P-picture and be marked as member of the Dependent Random Access Point sample group thereby indicating that random access can be performed at the $48^{th}$ sample by decoding the $32^{nd}$ sample and ignoring sample nos. 33-47, decoding the $48^{th}$ sample and the samples that follows the $48^{th}$ sample in decoding order.

Formally it is required that a sample is marked as member of the Dependent Random Access Point Sample Group and hence called a DRAP sample only if the following two conditions are true:

the DRAP sample references only the closest preceding RAP or SAP sample; and all samples following the DRAP sample in output order can be correctly decoded when starting decoding at the DRAP sample after having decoded the RAP or SAP sample.

A further optional, additional criterion is that the closest preceding RAP or SAP sample is of type 1, 2 or 3.

Syntax

```
class VisualDRAPEntry( ) extends VisualSampleGroupEntry ('drap'){
}
```

In an optional embodiment, the DRAP sample group may comprise the following syntax.

```
class VisualDRAPEntry( ) extends VisualSampleGroupEntry ('drap'){
unsigned int (3)      DRAP_type;
unsigned int (29)     reserved = 0;
}
```

In such a case, DRAP_type indicates, when DRAP_type is in the range of 1 to 3, the RAP or SAP type that the DRAP sample would have corresponded to, had it not depended on the closest preceding RAP or SAP sample.

The proposed technology comprises identifying DRAP pictures and their associated IRAP pictures for example in the case that the encoded bitstream is encapsulated in a media container file. The method for identifying the DRAPs preferably comprises inspecting a list or table that contains direct or indirect pointers to the locations of the DRAPs.

An advantage of the proposed technology is that DRAP pictures can be located and used for random access without the need for parsing the entire bitstream in order to detect or find their positions. Moreover, the proposed technology provides means for supporting DRAP pictures at file level for video codecs that otherwise do not support DRAP pictures in the bitstream, e.g. through the Dependent RAP indication SEI message in HEVC.

Figure 7:
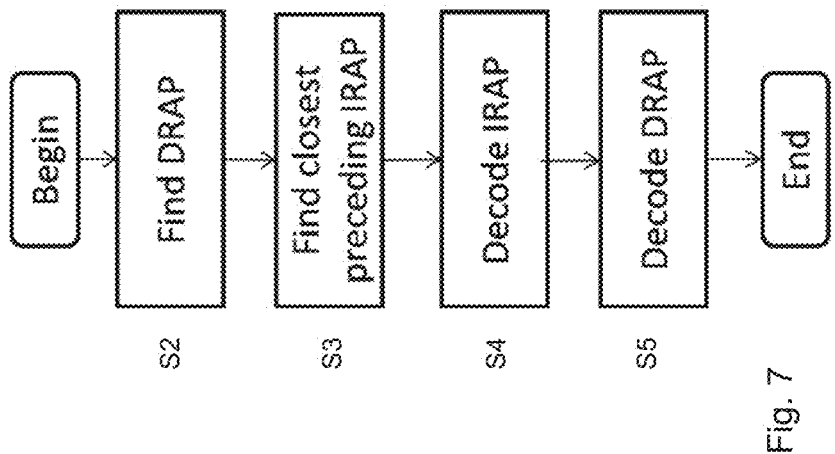
FIG. 7 is a flow chart illustrating a method for decoding DRAP samples according to an embodiment.

FIG. 7 is a flow chart illustrating an embodiment of a method for detecting and decoding DRAP pictures and samples in a bitstream or a media container file of encoded pictures or samples. The method comprises finding, in step S2, a DRAP picture or sample in the bitstream or media container file. A following step S3 comprises finding a closest preceding, according to a decoding order, IRAP picture or sample in the bitstream or media container file. The IRAP picture or sample is then decoded in step S4 and the DRAP picture or sample is decoded in step S5, preferably with the decoded IRAP picture or sample as reference picture or sample.

Thus, an embodiment of a method of decoding DRAP samples is shown in FIG. 7. The method comprises finding, in step S2, a DRAP sample in a media container file comprising a bitstream of encoded video content in the form of encoded pictures. The method also comprises finding, in step S3, a closest preceding, according to a decoding order, IRAP sample in the media container file. A following step S4 of the method comprises decoding the IRAP sample. The method further comprises decoding the DRAP sample with the decoded IRAP sample as reference sample in step S5.

Figure 8:
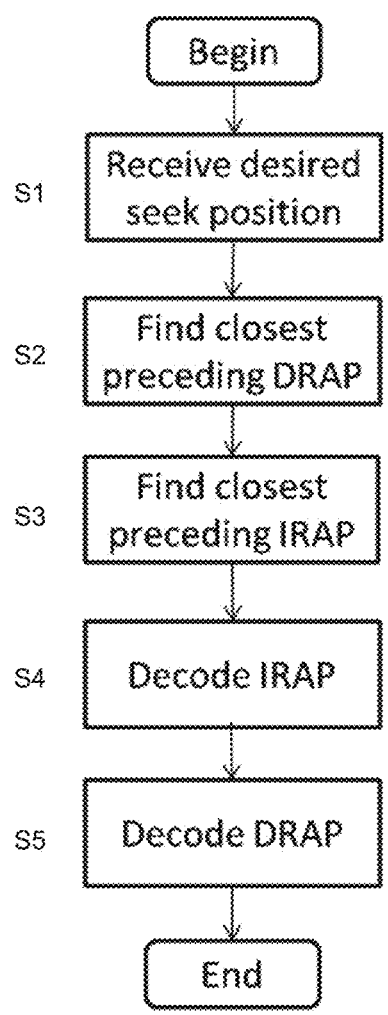
FIG. 8 is a flow chart illustrating an embodiment of a tune-in or seek method.

FIG. 8 is a flow chart illustrating an embodiment of a tune-in or seek method. The method starts in step S1 by receiving a tune-in or seek request defining a desired tune-in or seek position within a bitstream or media container file of encoded pictures or samples. The method also comprises finding, in step S2, a closest preceding, according to a decoding order, DRAP picture or sample in the bitstream or media container file based on the tune-in or seek request. A following step S3 comprises finding a closest, preceding the DRAP picture or sample, according to the decoding order, IRAP picture or sample in the bitstream or media container file. The IRAP picture or sample is then decoded in step S4 and the DRAP picture or sample is decoded in step S5, preferably with the decoded IRAP picture or sample as reference picture or sample.

The tune-in or seek method described above could be implemented as a particular embodiment of the method for decoding a DRAP sample. Thus, steps S2 to S5 in FIG. 8 basically correspond to steps S2 and S5 of FIG. 7. In such a case, step S1 could be seen as an additional step of the method shown in FIG. 7 in order to get the tune-in or seek method shown in FIG. 8. Hence, in an embodiment, the method for decoding DRAP samples comprises an additional step S1, which comprises receiving a tune-in or seek request defining a desired tune-in or seek position within the media container file. The method then continues to step S2. In this embodiment, step S2 preferably comprises finding a DRAP sample in the media container file associated with the desired tune-in or seek position based on the tune-in or seek request.

The method described above preferably finds the closest preceding DRAP picture or sample based on the tune-in or seek request. In another embodiment, the method comprises finding an associated DRAP picture or sample based on the tune-in or seek request. The associated DRAP picture or sample could be a DRAP picture or sample at the particular tune-in or seek position or the DRAP picture or sample that is closest to the particular tune-in or seek position. In the latter case, the DRAP picture or sample may precede or follow the tune-in or seek position, preferably precede the tune-in or seek position.

The decoding order of samples and pictures defines the order at which samples and pictures of a bitstream are decoded. Such a decoding order is generally the same as the encoding order, i.e. the order at which an encoder encoded samples and pictures. The decoding order may be different from the output order or display order, which defines the order at which decoded samples and pictures are output, such as output for display.

Thus, in an embodiment, step S2 of FIG. 8 comprises finding a closest preceding, according to the decoding order and relative to the tune-in or seek position, DRAP sample in the media container file based on the tune-in or seek request.

The methods as shown in FIGS. 7 and 8 optionally comprise decoding encoded pictures or samples following, according to the decoding order, the DRAP picture in the bitstream or media container file.

Thus, in an embodiment the method also comprises decoding encoded samples following, according to the decoding order, the DRAP picture in the media container file.

The steps of finding the DRAP picture or sample and finding the IRAP picture or sample are preferably performed according to any of the embodiments as disclosed herein.

In an embodiment, finding the DRAP picture or sample comprises inspecting a DRAP sample group in the media container file to find the DRAP sample. In this embodiment, finding the closest preceding IRAP picture or sample preferably comprises finding and extracting the immediately preceding IRAP sample from the media container file.

In an embodiment, finding and extracting the preceding IRAP sample comprises inspecting a RAP sample group in the media container file in order to retrieve information defining the position of the IRAP sample in the media container file. In a particular embodiment, the information retrieved from the RAP sample group is the sample number of the IRAP sample.

In another embodiment, finding and extracting the preceding IRAP sample comprises inspecting a sync sample table ('stss') box in the media container file in order to retrieve information defining the position of the IRAP sample in the media container file. In a particular embodiment, the information retrieved from the 'stss' box is the sample number of the IRAP sample.

A further embodiment of finding and extracting the preceding IRAP sample comprises inspecting a current or previous track fragment run ('trun') box or boxes in order to retrieve information defining the position of the IRAP sample in the media container file. In a particular embodiment, the information retrieved from the 'trun' box is the sample number of the IRAP sample.

In another embodiment, finding the DRAP picture or sample comprises inspecting a table or list comprising information of picture or sample type and/or picture or sample property information. The DRAP picture or sample is then identified as the picture or sample indicated as DRAP picture or sample in the table or list that is closest to the desired tune-in or seek position, preferably closest to but preceding the desired tune-in or seek position. Finding the IRAP picture or sample preferably comprises, in this embodiment, inspecting the table or list to identify the picture or sample indicated as IRAP picture or sample in the table or list that is closest to and preceding the identified DRAP picture or sample.

Thus, in an embodiment, the DRAP sample is found by inspecting a list comprising information of sample type and/or sample property information. The DRAP sample is identified as a sample indicated as a DRAP sample in the list and that is closest to a desired tune-in or seek position. The IRAP sample is preferably found by inspecting the list to identify a sample indicated as IRAP sample in the list and that is closest to and preceding the identified DRAP sample.

In a particular embodiment, the DRAP sample is identified as a sample indicated as DRAP sample in the list and that is closest to but preceding the desired tune-in or seek position. This is, however, an implementation decision. If the tune-in or seek position must be exact, then you have to start decoding at the DRAP sample (after the IRAP sample has been decoded) before that position and roll forward until reaching the exact tune-in or seek position. If it is not necessary to start at the exact tune-in or seek position, then the decoding can start at the closest preceding DRAP sample or IRAP sample.

In a further embodiment, finding the DRAP picture or sample comprises inspecting packet headers in order to identify a data packet, such as RTP packet, comprising a DRAP picture or sample in the bitstream, such as RTP stream. Finding the IRAP picture or sample preferably comprises, in this embodiment, inspecting packet headers in order to identify a data packet, such as RTP packet, comprising an IRAP picture or sample in the bitstream, such as RTP stream, that precedes the DRAP picture or sample.

In yet another embodiment, finding the DRAP and IRAP pictures or sample comprises inspecting a RAP sample group or sync sample table ('stss') box in the media container file to find a RAP picture or sample closest to the desired tune-in or seek position, preferably closest to but preceding the desired tune-in or seek position. The identified RAP picture or sample is then investigated in order to determine whether it is a DRAP picture or sample or an IRAP picture or sample.

In an embodiment, such an investigation is performed by inspecting or checking for any DRAP SEI message associated with the identified RAP picture or sample. If the identified RAP picture or sample is associated with a DRAP SEI message then the identified RAP picture or sample is determined to be a DRAP picture or sample and if no such DRAP SEI message is associated with the identified RAP picture or sample the identified RAP picture or sample is determined to be an IRAP picture or sample.

In another embodiment, the investigation is performed by identifying picture or sample type of the identified RAP picture or sample based on picture or sample type and/or property information present in the media container file and determining whether the identified RAP picture or sample is a DRAP picture or sample or an IRAP picture or sample based on the picture or sample type or property information.

If the identified RAP picture or sample is determined to be a DRAP picture or sample, the RAP sample group or the 'stss' box is inspected in order to find the immediately preceding IRAP picture or sample.

In an embodiment, one or more samples that fulfill the requirements of DRAPs are indicted as DRAP samples in the file format by including the samples in a DRAP sample group, i.e. including information in the DRAP sample group identifying the at least one sample as a DRAP sample.

In an embodiment, one or more samples that fulfill the requirements of DRAPs are indicted as DRAP samples in the media container file through including the samples in a DRAP sample group, i.e. including information in the DRAP sample group identifying the at least one sample as a DRAP sample.

In an embodiment, the following steps are performed when a media container file is created, generated or constructed:

One or more samples that fulfill the requirements of RAP are indicated as RAP or sync samples.

One or more samples that fulfill the requirements of DRAPs are indicted as DRAP samples in the media container file through including the samples in a DRAP sample group, i.e. including information in the DRAP sample group identifying the at least one sample as a DRAP sample.

In an embodiment, the following steps are performed when a media container file is created, generated or constructed based on an HEVC bitstream:

One or more samples that are marked as IRAP in the HEVC bitstream are indicated as RAP or sync samples.

One or more samples that are marked as DRAPs in the HEVC bitstream are indicted as DRAP samples in the media file through including the samples in a DRAP sample group, i.e. including information in the DRAP sample group identifying the at least one sample as a DRAP sample.

Indicating a sample as RAP can be performed as described herein, such as including the sample in a RAP sample group or including the sample in the sample sync table.

Decoding of the IRAP picture or sample is preferably preformed according to video decoding standards or specifications, such as HEVC (H.265), including extensions and variant thereof, or another video decoding standard or specification.

Decoding of the DRAP picture or sample is preferably performed as discussed herein. The DRAP picture or sample may not include any picture in RefPicSetStCurrBefore, RefPicSetStCurrAfter, or RefPicSetLtCurr except its associated IRAP picture or sample. The DRAP picture or sample shall be a TRAIL_R picture or sample with temporal id equal to 0 and layer id equal to 0. Any picture or sample that follows the DRAP picture or sample in output order and decoding order shall not include, in its reference picture set (RPS), any picture or sample that precedes the DRAP picture or sample in output order or decoding order with the exception of the IRAP picture or sample associated with the DRAP picture or sample. When decoding the DRAP picture or sample, the associated IRAP picture or sample is first decoded and the value of pic_output_flag should be inferred to be equal to 0 for all pictures or samples that precede the DRAP picture or sample in output order.

A media container file as described herein is preferably a file comprising time-based video content and optionally also audio content. The media container file is preferably structured as defined by the ISOBMFF and can, for instance, be in the form of a MP4 container file or 3GP container file as illustrative but non-limiting examples. A media container file could be in the form of a single container file or a fragmented container file.

Another aspect of the embodiments relates to a device for detecting or decoding DRAP pictures and samples in a bitstream or a media container file of encoded pictures or samples. The device is configured to find a DRAP picture or sample in the bitstream or media container file. The device is also configured to find a closest preceding, according to a decoding order, IRAP picture or sample in the bitstream or media container file. The device is further configured to decode the IRAP picture or sample and the DRAP picture or sample, preferably with the decoded IRAP picture or sample as reference picture or sample.

A further aspect of the embodiments relates to a tune-in or seek device, also referred to as a video or file parser. The device is configured to receive a tune-in or seek request defining a desired tune-in or seek position within a bitstream or media container file of encoded pictures or samples. The device is also configured to find a closest preceding, according to a decoding order, DRAP picture or sample in the bitstream or media container file based on the tune-in or seek request. The device is further configured to find a closest, preceding, according to the decoding order, IRAP picture or sample in the bitstream or media container file. The device is additionally configured to decode the IRAP picture or sample and the DRAP picture or sample, preferably with the decoded IRAP picture or sample as reference picture or sample.

The devices are optionally configured to decode encoded pictures or sample following, according to the decoding order, the DRAP picture in the bitstream or media container file.

The devices are preferably configured to find the DRAP picture or sample and find the IRAP picture or sample as previously described herein.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Another aspect of the embodiments relates to a device for decoding DRAP samples. The device is configured to find a DRAP sample in a media container file comprising a bitstream of encoded video content in the form of encoded pictures. The device is also configured to find a closest preceding, according to a decoding order IRAP sample in the media container file. The device is further configured to decode the IRAP sample and decode the DRAP sample with the decoded IRAP sample as reference sample.

In an embodiment, the device is configured to receive a tune-in or seek request defining a desired tune-in or seek position within the media container file. The device is also configured to find a DRAP sample in the media container file associated with the desired tune-in or seek position based on the tune-in or seek request.

In an embodiment, the device is configured to find a closest preceding, according to the decoding order and relative to the tune-in or seek position, DRAP sample in the media container file based on the tune-in or seek request.

In an embodiment, the device is configured to decode encoded samples following, according to the decoding order, the DRAP picture in the media container file.

In an embodiment, the device is configured to inspect a DRAP sample group in the media container file to find the DRAP sample. The device is also configured to find and extract an immediately preceding IRAP sample from the media container file.

In an embodiment, the device is configured to inspect a RAP sample group in the media container file in order to retrieve information defining a position of the IRAP sample in the media container file.

In an embodiment, the device is configured to inspect a sync sample table box in the media container file in order to retrieve information defining a position of the IRAP sample in the media container file.

In an embodiment, the device is configured to inspect a current or previous track fragment run box in order to retrieve information defining a position of the IRAP sample in the media container file.

In an embodiment, the device is configured to inspect a list comprising information of sample type and/or sample property information. The device is also configured to identify the DRAP sample as a sample indicated as DRAP the device is configured to inspect the list to identify a sample indicated as IRAP sample in the list and that is closest to and preceding the identified DRAP sample.

In an embodiment, the device is configured to inspect a RAP sample group or sync sample table box in the media container file to find a RAP sample closest to a desired tune-in or seek position. The device is also configured to investigate the identified RAP sample in order to determine whether the identified RAP sample is a DRAP sample or an IRAP sample.

In an embodiment, the device is configured to inspect any DRAP SEI message associated with the identified RAP sample. The device is also configured to determine, if the identified RAP sample is associated with a DRAP SEI message, the identified RAP sample to be a DRAP sample. The device is further configured to determine, if no such DRAP SEI message is associated with the identified RAP sample, the identified RAP sample to be an IRAP sample.

In an embodiment, the device is configured to identify a sample type of the identified RAP sample based on sample type and/or property information present in the media container file. The device is also configured to determine whether the identified RAP sample is a DRAP sample or an IRAP sample based on the sample type or property information.

In an embodiment, the device is configured to inspect, if the identified RAP sample is determined to be a DRAP sample, the RAP sample group or the sync sample table box in order to find an immediately preceding IRAP sample.

FIG. 9 illustrates a particular hardware implementation of a device 100 for decoding DRAP samples according to the embodiments. In an embodiment, the device 100 comprises a DRAP finder 101 configured to find a DRAP picture or sample in the bitstream or media container file. The device 100 also comprises an IRAP finder 102 configured to find an IRAP picture or sample in the bitstream or media container file. The device 100 further comprises a video decoder 103 configured to decode the IRAP picture or sample and the DRAP picture or sample.

In an embodiment, the device 100 also comprises an input unit 104 configured to receive a tune-in or seek request and an output unit 105 configured to output decoded pictures or samples. The input unit 104 is preferably also configured to receive the bitstream or media container file.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 be in the form of a general output unit, in particular in the case of a wired connection to external devices. Alternatively, the output unit 105 could be in the form of a transmitter or transceiver, in particular in the case or a wireless connection to external devices The input unit 104 is preferably connected to the DRAP finder 101, the IRAP finder 102 and the video decoder 103 to forward the bitstream or media container file thereto. The DRAP finder 101 is preferably connected to the IRAP finder 102 and the video decoder 103 to forward information, such as picture or sample number or identifier, of the identified DRAP picture or sample thereto. The IRAP finder 102 is preferably connected to the video decoder 103 to forward information, such as picture or sample number or identifier, of the identified IRAP picture or sample thereto. The video decoder 103 is preferably connected to the output unit 105 to forward decoded pictures or samples thereto.

Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers, and/or memory units.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the device 110, see FIG. 10, comprises a processor 111 and a memory 112 comprising instructions executable by the processor 111. The processor 111 is operative to find the DRAP picture or sample in the bitstream or media container file. The processor 111 is also operative to find the IRAP picture or sample in the bitstream or media container file. The processor 111 is further operative to decode the IRAP picture or sample and the DRAP picture or sample.

In an embodiment, the device 110 also comprises an input unit 113 configured to receive the bitstream or media container file and a tune-in or seek request. In such a case, the processor 111 is operative to receive the tune-in or seek request from the input unit 113.

In an embodiment, the device 110 also comprises an output unit 114 configured to output decoded pictures or samples as received from the processor 111.

In a particular embodiment, the processor 111 is operative, when executing the instructions stored in the memory 112 to perform the above described operations. The processor 111 is thereby interconnected to the memory 112 to enable normal software execution.

Figure 11:
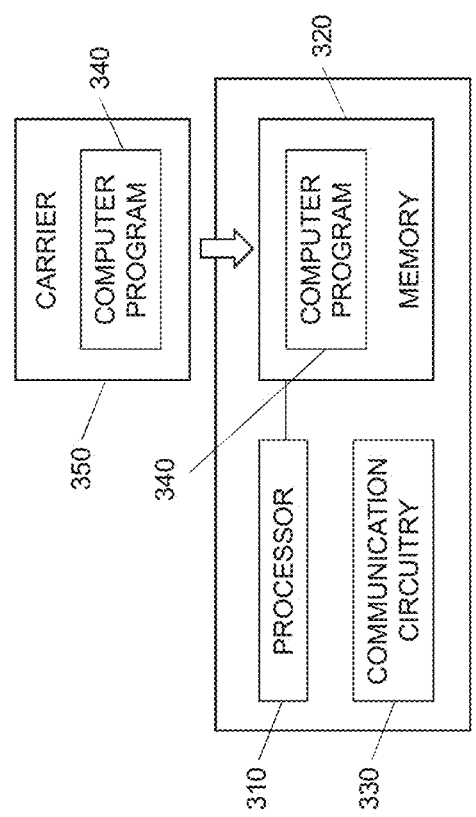
FIG. 11 is a schematic block diagram of a computer program based implementation according to an embodiment.

FIG. 11 is a schematic block diagram illustrating an example of a user equipment (UE) 300 comprising a processor 310, an associated memory 320 and a communication circuitry 330.

In this particular example, at least some of the steps, functions, procedures, modules and/or blocks described herein are implemented in a computer program 340, which is loaded into the memory 320 for execution by processing circuitry including one or more processors 310. The processor 310 and memory 320 are interconnected to each other to enable normal software execution. A communication circuitry 330 is also interconnected to the processor 310 and/or the memory 320 to enable input and/or output of video data and tune-in or seek requests.

The user equipment 300 can be any device or apparatus that can receive and process encoded video data of a bitstream or media container file. For instance, the user equipment 300 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 340 comprises instructions, which when executed by the processor 310, cause the processor 310 to find a DRAP picture or sample in the bitstream or media container file comprising a bitstream of encoded video content in the form of encoded pictures. The processor 310 is also caused to find a closest preceding, according to a decoding order, IRAP picture or sample in the bitstream or media container file. The processor 310 is further caused to decode the IRAP picture or sample and the DRAP picture or sample, preferably with the decoded IRAP picture or sample as reference picture or sample.

In another embodiment, the computer program 340 comprises instructions, which when executed by the processor 310, cause the processor 310 to receive a tune-in or seek request defining a desired tune-in or seek position within a bitstream or media container file of encoded pictures or samples. The processor 310 is also caused to find a closest preceding, according to a decoding order, DRAP picture or sample in the bitstream or media container file based on the tune-in or seek request. The processor 310 is further caused to find a closest, preceding, according to the decoding order, IRAP picture or sample in the bitstream or media container file. The processor 310 is additionally caused to decode the IRAP picture or sample and the DRAP picture or sample, preferably with the decoded IRAP picture or sample as reference picture or sample.

The proposed technology also provides a carrier 350 comprising the computer program 340. The carrier 350 is one of an electronic signal, an optical signal, an electromagnetic signal, a magnetic signal, an electric signal, a radio signal, a microwave signal, or a computer-readable storage medium 350.

By way of example, the software or computer program 340 may be realized as a computer program product, which is normally carried or stored on a computer-readable medium 340, preferably non-volatile computer-readable storage medium 350. The computer-readable medium 350 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 340 may thus be loaded into the operating memory of a computer or equivalent processing device, represented by the user equipment 300 in FIG. 11, for execution by the processor 310 thereof.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 12.

Figure 12:
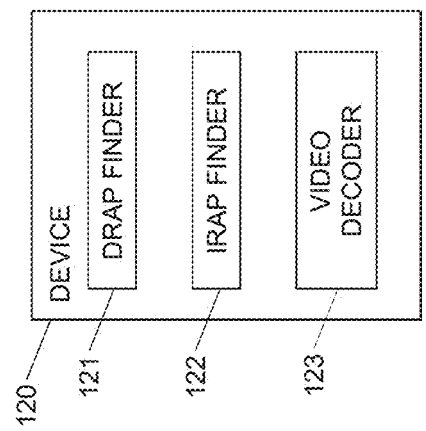
FIG. 12 is a schematic block diagram of a device for decoding DRAP samples according to a further embodiment.

FIG. 12 is a schematic block diagram of a device 120 for decoding DRAP samples with function modules. The device 120 comprises a DRAP finder 121 for finding a DRAP picture or sample in a bitstream or a media container file comprising a bitstream of encoded video content in the form of encoded pictures. The device 120 also comprises an IRAP finder 122 for finding a closest preceding, according to a decoding order, IRAP picture or sample in the bitstream or media container file. The device 120 further comprises a video decoder 123 for decoding the IRAP picture or sample and the DRAP picture or sample, preferably with the decoded IRAP picture or sample as reference picture or sample.

In another embodiment, the device 120 comprises a DRAP finder 121 for finding, in a bitstream or media container file of encoded pictures or samples, a DRAP picture or sample that is a closest preceding, according to a decoding order, DRAP picture or sample in the bistream or media container file relative to a desired tune-in or seek position within the bitstream or media container file defined by a received a tune-in or seek request. The device 120 also comprises an IRAP finder 122 for finding a closest, preceding, according to the decoding order, IRAP picture or sample in the bitstream or media container file. The device 120 further comprises a video decoder 123 for decoding the IRAP picture or sample and the DRAP picture or sample, preferably with the decoded IRAP picture or sample as reference picture or sample.

The device of the various embodiments may be implemented as a computer, either stationary or portable, such as laptop, a smart phone, a tablet, a set-top box, etc., or as a part of a computer, either stationary or portable, such as laptop, a smart phone, a tablet, a set-top box, etc.

Aspects of the embodiments also relates to methods, devices and computer programs for creating a media container file comprising at least one DRAP picture or sample and at least one IRAP picture or sample.

Generally, RAP sample is a term given in the ISOBMFF to a sample defined in the sample group with grouping type rap. Samples in this group are so-called open-GOP I-Frames meaning that both samples before and after it in presentation order are allowed to reference it.

A sync sample is a term given in the ISOBMFF which equates to a closed-GOP I-Frame in the video codecs. This means only samples after it in presentation order can reference it.

IRAP is a terms used in video codecs, such as in HEVC. A sample in a media container file can be specifically labeled as IRAP. An IRAP can be many sample types, one of which is the open-GOP I-Frame that is indicated in the sample group with grouping type rap. Open-GOP I-Frames can be included in the bitstream without being marked as an IRAP. DRAP samples can preferably only reference samples specifically marked as IRAP.

Here below follows various examples of media container files comprising DRAP pictures or samples.

```
ftyp (28 bytes, pos 0-27) [FtypBox]
moov (9847 bytes, pos 28-9874) [MoovBox]
  mvhd (108 bytes, pos 36-143) [MvhdBox]
  trak (9731 bytes, pos 144-9874) [TrakBox]
    tkhd (92 bytes, pos 152-243) [TkhdBox]
    edts (36 bytes, pos 244-279) [EdtsBox]
      elst (28 bytes, pos 252-279) [ElstBox]
    mdia (9595 bytes, pos 280-9874) [MdiaBox]
      mdhd (32 bytes, pos 288-319) [MdhdBox]
      hdlr (64 bytes, pos 320-383) [HdlrBox]
      minf (9491 bytes, pos 384-9874) [MinfBox]
        vmhd (20 bytes, pos 392-411) [VmhdBox]
        dinf (36 bytes, pos 412-447) [DinfBox]
          dref (28 bytes, pos 420-447) [DrefBox]
            url (12 bytes, pos 436-447) [UrlBox]
        stbl (9427 bytes, pos 448-9874) [StblBox]
          stsd (238 bytes, pos 456-693) [StsdBox]
            hvc1 (222 bytes, pos 472-693) [DataBox]
          stts (24 bytes, pos 694-717) [SttsBox]
          ctts (5288 bytes, pos 718-6005) [DataBox]
          stss (20 bytes, pos 6006-6025) [StssBox]
          stsc (52 bytes, pos 6026-6077) [StscBox]
          stsz (3020 bytes, pos 6078-9097) [StszBox]
          stco (268 bytes, pos 9098-9365) [StcoBox]
          sgpd (25 bytes, pos 9366-9390) [SgpdBox]
          sbgp (484 bytes, pos 9391-9874) [SbgpBox]
mdat (5079721 bytes, pos 9875-5089595) [MdatBox]
free (65 bytes, pos 5089596-5089660) [FreeBox]
```

The above described boxes are generally present in a typical media container file. Indents imply that a box is a child of its parent. The 'moov' box and its child boxes above constitute the header of the media container file, whereas the 'mdat' box comprises the actual media content, i.e. the video bitstream.

A sample table contains information about the samples in the bitstream. Here below follows an example of such a sample table.

```
stbl (9427 bytes, pos 448-9874) [StblBox]
  stsd (238 bytes, pos 456-693) [StsdBox]
    hvc1 (222 bytes, pos 472-693) [DataBox]
  stts (24 bytes, pos 694-717) [SttsBox]
  ctts (5288 bytes, pos 718-6005) [DataBox]
```

-continued

```
  stss (20 bytes, pos 6006-6025) [StssBox]
  stsc (52 bytes, pos 6026-6077) [StscBox]
  stsz (3020 bytes, pos 6078-9097) [StszBox]
  stco (268 bytes, pos 9098-9365) [StcoBox]
  sgpd (25 bytes, pos 9366-9390) [SgpdBox]
  sbgp (484 bytes, pos 9391-9874) [SbgpBox]
```

The 'hvc1' box comprises the information to set up the decoder, i.e. HEVC decoder in the present example. The 'stss' box is a list of sync samples, i.e. a list of RAP samples. The 'sgpd' box is a sample group description and the 'sbgp' box is where the samples are assigned to the group.

In the above illustrated example the sync samples could be exemplified as:

```
stss (20 bytes, pos 6006-6025) [StssBox]
  > randomAccessPoints: [1]
```

This means that in this illustrative example there is only one sync sample in the media container file and this sync sample is the very first picture of the bitstream.

Generally, the quickest way of identifying or finding a RAP sample in a media container file it to inspect the list defined by the sync sample table ('stss').

Illustrative examples of the sample group description and sample groups are presented below.

```
sgpd (25 bytes, pos 9366-9390) [SgpdBox]
  > grouping_type: rap
  > default_length: 1
  > entry_count: 1
  > entries: [{'num_leading_samples': 0, 'num_leading_samples_known':
    0, 'description_length': 1}]
sbgp (484 bytes, pos 9391-9874) [SbgpBox]
  > grouping_type: rap
  > entry_count: 58
  > entries: [{'group_description_index': 0, 'sample_count': 25},
    {'group_description_index': 1, 'sample_count': 1},
    {'group_description_index': 0, 'sample_count': 21},
    {'group_description_index': 1, 'sample_count': 1},
    {'group_description_index': 0, 'sample_count': 23},
    {'group_description_index': 1, 'sample_count': 1},
    {'group_description_index': 0, 'sample_count': 25},
    {'group_description_index': 1, 'sample_count': 1},
    {'group_description_index': 0, 'sample_count': 26},
    {'group_description_index': 1, 'sample_count': 1},
    {'group_description_index': 0, 'sample_count': 22},
    {'group_description_index': 1, 'sample_count': 1}
    ...
  ]
```

The 'sgpd' box describes the group. In the example above, the group is a RAP group. Note that the samples in the RAP group are not the same as samples in the sync sample table. The very first sample present in the sync sample table is not in the DRAP group in this example.

The entries in the 'sbgp' box constitutes a run-length-encoded table or list. Samples either belong to entry number 1 in the group description table, such as {'group_description_index': 1, 'sample_count': 1}, or does not belong to any group, such as {'group_description_index': 0, 'sample_count': 23}.

Decoding the run-length-encoded list would result in a long list of {true|false}, with one value for each sample in the video bitstream. This provides information of which samples that are RAP samples in the video bitstream.

A DRAP group may be added to the media container file by adding another 'sgpd' box and another 'sbgp' box with the appropriate contents, such as grouping type equal to 'drap'.

Hence, in an embodiment a media container file is generated to include a DRAP sample group description ('sgpd' box) and a DRAP sample group ('sbgp' box) with grouping_type: 'drap'. These boxes can then be used in order to find a DRAP sample in the media container file that is associated with a tune-in or seek position defined by a tune-in or seek request. Once the position of the DRAP sample is identified or found in the bitstream, which is defined by the media track ('moov' box) and contained within the 'mdat' box, the immediately preceding IRAP sample can be found and extracted from the bitstream.

In an embodiment, the RAP sample group ('sbgp' box) with grouping_type: 'rap' is inspected in order to find the immediately preceding IRAP sample. In another embodiment, the sync sample table, i.e. 'stss' box, is investigated in order to find the immediately preceding IRAP sample.

If the media container file is fragmented another embodiment can be used in order to find and extract the immediately preceding IRAP sample. This is described in more detail below.

```
ftyp (36 bytes, pos 0-35) [FtypBox]
free (58 bytes, pos 36-93) [FreeBox]
moov (831 bytes, pos 94-924) [MoovBox]
  mvhd (108 bytes, pos 102-209) [MvhdBox]
  mvex (72 bytes, pos 210-281) [MvexBox]
    mehd (16 bytes, pos 218-233) [MehdBox]
    trex (32 bytes, pos 234-265) [TrexBox]
    trep (16 bytes, pos 266-281) [DataBox]
  trak (643 bytes, pos 282-924) [TrakBox]
    tkhd (92 bytes, pos 290-381) [TkhdBox]
    edts (36 bytes, pos 382-417) [EdtsBox]
      elst (28 bytes, pos 390-417) [ElstBox]
    mdia (507 bytes, pos 418-924) [MdiaBox]
      mdhd (32 bytes, pos 426-457) [MdhdBox]
      hdlr (64 bytes, pos 458-521) [HdlrBox]
      minf (403 bytes, pos 522-924) [MinfBox]
        vmhd (20 bytes, pos 530-549) [VmhdBox]
```

-continued

```
        dinf (36 bytes, pos 550-585) [DinfBox]
          dref (28 bytes, pos 558-585) [DrefBox]
```

```
            url (12 bytes, pos 574-585) [UrlBox]
        stbl (339 bytes, pos 586-924) [StblBox]
          stsd (238 bytes, pos 594-831) [StsdBox]
            hvc1 (222 bytes, pos 610-831) [DataBox]
          stts (16 bytes, pos 832-847) [SttsBox]
          stsc (16 bytes, pos 848-863) [StscBox]
          stsz (20 bytes, pos 864-883) [StszBox]
          stco (16 bytes, pos 884-899) [StcoBox]
          sgpd (25 bytes, pos 900-924) [SgpdBox]
  sidx (44 bytes, pos 925-968) [SidxBox]
  moof (316 bytes, pos 969-1284) [MoofBox]
    mfhd (16 bytes, pos 977-992) [MfhdBox]
    traf (292 bytes, pos 993-1284) [TrafBox]
      tfhd (16 bytes, pos 1001-1016) [TfhdBox]
      tfdt (16 bytes, pos 1017-1032) [TfdtBox]
      sbgp (28 bytes, pos 1033-1060) [SbgpBox]
      trun (224 bytes, pos 1061-1284) [TrunBox]
  mdat (69852 bytes, pos 1285-71136) [MdatBox]
  ...
```

A fragmented file comprises only general sample information in its header. In this case, the bitstream is added in fragments. The fragments are designed for adding media as it becomes available. Hence, there is no individual sample information in the header, e.g. no sync sample box, i.e. 'stss' box.

The group description, i.e. 'sgpd' box, can still be present in the header (within the 'moov' box), see sgpd (25 bytes, pos 900-924) [SgpdBox] above, and/or it can be in the fragment header (within the 'moof' box), see tfdt (16 bytes, pos 1017-1032) [TfdtBox] above. The samples are not assigned to the group (using sbgp (28 bytes, pos 1033-1060) [SbgpBox]) until they are available, i.e. when the fragment is added.

```
moov (831 bytes, pos 94-924) [MoovBox]
  mvhd (108 bytes, pos 102-209) [MvhdBox]
  mvex (72 bytes, pos 210-281) [MvexBox]
    mehd (16 bytes, pos 218-233) [MehdBox]
    trex (32 bytes, pos 234-265) [TrexBox]
      > track_ID: 1
      > default_sample_description_index: 1
      > default_sample_duration: 1
      > default_sample_size: 0
      > default_sample_flags: {'sample_is_depended_on': 0, 'sample_has_redundancy': 0,
'sample_degradation_priority': 0, 'sample_is_non_sync_sample': 1, 'sample_padding_value':
0,
'sample__depends__on': 0, 'is_leading': 0}
```

The movie header contains default sample information, which may be overridden in the fragments, see the 'trex' box above. The same flags are used later for samples in the fragments.

Below is a first example of a fragmented filed.

```
moof (316 bytes, pos 969-1284) [MoofBox]
  mfhd (16 bytes, pos 977-992) [MfhdBox]
    > sequence_number: 1
  traf (292 bytes, pos 993-1284) [TrafBox]
```

```
tfhd (16 bytes, pos 1001-1016) [TfhdBox]
    > track_ID: 1
    > f: DEFAULT_BASE_IS_MOOF:0x20000
  tfdt (16 bytes, pos 1017-1032) [TfdtBox]
    > baseMediaDecodeTime: 0
  sbgp (28 bytes, pos 1033-1060) [SbgpBox]
    > grouping_type: rap
    > entry_count: 1
    > entries: [{'group_description_index': 0, 'sample_count': 25}]
  trun (224 bytes, pos 1061-1284) [TrunBox]
    > f: DATA_OFFSET_PRESENT:0x1 | FIRST_SAMPLE_FLAGS_PRESENT:0x4 |
SAMPLE_SIZE_PRESENT:0x200 | SAMPLE_COMPOSITION_TIME_OFFSETS_PRESENT:
0x800
    > sample_count: 25
    > data_offset: 324
    > first_sample_flags: {'sample_is_depended_on': 0,'sample_has_redundancy': 0,
'sample_degradation_priority': 0, 'sample_is_non_sync_sample': 0, 'sample_padding_value':
0,
'sample_depends_on': 0, 'is_leading': 0}
    > samples: [{'composition_time_offset': 2, 'size': 968}, {'composition_time_offset': 3,
      'size':
3353}, {'composition_ time_offset': 1, 'size': 39}, {'composition_time_offset': 6, 'size':
2929}, ...
```

The 'sbgp' box is where samples are assigned to the groups. In the above illustrated example fragment, there are no samples which belong to the RAP group. The fragment has special flags for the first sample, FIRST_SAMPLE_F-LAGS_PRESENT:0x4. The other samples will have the default flags.

The first sample is a sync sample, 'sample_is_non_sync_sample': 0 among the first_sample_flags. This enables identification of an IRAP sample.

">samples:" above comprises a list of samples in the fragment with information about each sample. This list could also contain individual flags for each sample, which could also indicate where an IRAP sample is.

Below is a second example of a fragmented file:

The first sample is a sync sample in this example fragment too as indicated by 'sample_is_non_sync_sample': 0.

Hence, a media container file 1 according to the embodiments preferably comprises, see FIG. 15, a 'moov' box 2 that comprises metadata of a presentation and at least one 'mdat' box 3 that comprises a bitstream of encoded video content in the form of encoded pictures. The media container file 1 preferably also comprises a sample table, 'stbl' box, 5 that comprises metadata related to samples in the media container file 1, preferably sample per sample. The sample table box 5 preferably comprises a sample group description, 'sgpd' box, 6 and a sample group, 'sbgp' box, 7 with grouping type equal to 'drap'. These boxes 6, 7 thereby

```
moof (300 bytes, pos 71181-71480) [MoofBox]
  mfhd (16 bytes, pos 71189-71204) [MfhdBox]
    > seguence_number: 2
  traf (276 bytes, pos 71205-71480) [TrafBox]
    tfhd (16 bytes, pos 71213-71228) [TfhdBox]
      > track_ID: 1
      > f: DEFAULT_BASE_IS_MOOF:0x20000
    tfdt (16 bytes, pos 71229-71244) [TfdtBox]
      > baseMediaDecodeTime: 25
    sbgp (36 bytes, pos 71245-71280) [SbgpBox]
      > grouping_type: rap
      > entry_count: 2
      > entries: [{'group_description_index': 1, 'sample_count': 1}, {'group_description_
        index': 0,
'sample_count': 21}]
    trun (200 bytes, pos 7128171480) [TrunBox]
      > f: DATA_OFFSET_PRESENT:0x1 | FIRST_SAMPLE_FLAGS_PRESENT:0x4 |
SAMPLE_SIZE_PRESENT:0x200 | SAMPLE_COMPOSITION_TIME_OFFSETS_PRESENT:
0x800
      > sample_count: 22
      > data_offset: 308
      > first_sample_flags: {'sample_is_depended_on': 0, 'sample_has_redundancy': 0,
'sample_degradation_priority': 0, 'sample_is_non_sync_sample': 0, 'sample_padding_value':
0,
'sample_depends_on': 0, 'is_leading': 0}
      > samples: [{'composition_time_offset': 2, 'size': 11393}, {'composition_time_offset':
        3, 'size':
8998}, {'composition_time_offset': 1, 'size': 3508}, ... ]
```

In the example fragment above, the first sample is a part of the RAP sample group as shown in the 'sbgp' box. This is another way of finding an IRAP sample as compared to investigating the 'trun' box as in the previous example fragment.

comprise information allowing identification of one or more DRAP samples in the bitstream contained in the at least one 'mdat' box 3. The media container file 1 also comprises information allowing identification of a closest preceding IRAP sample in the bitstream given the position of the DRAP sample in the bitstream. The position of the DRAP sample in the bitstream is defined based on the information comprised in the sample group description 6 and sample group 7 with 'drap' as grouping type.

In an embodiment, the media container file 1 comprises a sample group description, 'sgpd' box, 6 and a sample group, 'sbgp' box, 7 with grouping type equal to 'rap'. These boxes thereby comprise information allowing identification of IRAP samples in the bitstream contained in the at least one 'mdat' box 3. Hence, in an embodiment, the information comprised in the sample group description and sample group with grouping type equal to 'rap' defines a closest preceding IRAP sample in the bitstream, given the position of the DRAP sample.

In a particular embodiment, the closest preceding sample, relative to the position of the DRAP sample, in the sample group 7 with 'rap' as grouping type is also marked as an IRAP picture in the bitstream. In this way, the decoder can assume that the closest preceding RAP sample is an IRAP picture.

In another embodiment, the media container file 1 comprises a sync sample table, 'stss' box, 8 comprising information enabling identification of the closest preceding IRAP sample in the bitstream given the position of the DRAP sample. In an embodiment, the 'stss' box 8 is preferably comprised within the 'stbl' box 5. In such a case, a closest preceding IRAP sample in the bitstream can be identified, given the position of a DRAP sample, using the information comprised in the sync sample table.

In a particular embodiment, the closest preceding sample, relative to the position of the DRAP sample, in the sync sample table 8 is also marked as an IRAP picture in the bitstream. In this way, the decoder can assume that the closest preceding RAP sample is an IRAP picture.

The sync sample table and the sample group with grouping type 'rap' generally indicate different types of RAP. The sync sample table was designed to generically cover all types of samples where decoding can start, whereas the sample group with grouping type 'rap' may only include open-GOP I-Frames.

In a further embodiment, particularly applied to fragmented files, each fragmented file comprises a media data box comprising a part of the encoded video content of the bitstream. Each fragment file also comprises a movie fragment, 'moof' box that comprises part of the metadata relating to the video content comprised in the 'mdat' box of the fragmented file. The 'moof' box preferably comprises a track fragment run, 'trun', box, which in turn comprises information enabling identification of positions of IRAP samples in the bitstream.

This information included in the 'trun' box may, for instance, be in the form of a flag indicating whether an associated sample is an IRAP sample or not. Hence, in an embodiment a closest preceding IRAP sample in the bitstream can be identified, given the position of a DRAP sample, using the information comprises in a current or previous track fragment run box.

In an embodiment applicable to fragmented files, the information generally contained within the sample group description may be included in a track fragment header, 'tlhd', box. Hence, in such an embodiment, a closest preceding IRAP sample in the bitstream can be identified, given the position of a DRAP sample, using information comprises in the track fragment header and the sample group with rap as grouping type.

A further embodiment relates to a carrier comprising a media container file as defined above. In a particular embodiment, the carrier is in the form of a storage medium, preferably a computer-readable storage medium. In another particular embodiment, the carrier is a signal, such as an electronic signal, an optical signal, electromagnetic signal, a magnetic signal, an electric signal, a radio signal or a microwave signal.

A method of creating or generating a media container file 1 is shown in FIG. 16 and preferably comprises including, in step S10, a sample group description 6 and/or a sample group 7 with grouping type 'drap' comprising information identifying a position of a DRAP sample within a bitstream of encoded pictures comprised in the media container file 1. The method also comprises including, in step S11, information in the media container file 1 of a closest preceding IRAP sample within the bitstream given a position of a DRAP sample in the bitstream. The information enables identification of the closest preceding IRAP sample within the bitstream. The closest preceding IRAP sample is preferably a reference sample for the DRAP sample. The method also comprises including the bitstream in the media container file 1 in step S12.

In an embodiment, the sample group description is in the form of the 'sgpd' box and is also denoted DRAP sample group description herein if the grouping type of the sample group description is 'drap'. Corresponding, the sample group, sometimes referred to as sample to group, is in the form of the 'sbgp' box and is also denoted DRAP sample group or DRAP sample to group herein if the grouping type of the sample group is 'drap'.

In an embodiment, including the bitstream in step S12 comprises including the bitstream in one or more media data boxes 3 in the media container file 1.

In an embodiment, including the information of the closest preceding IRAP sample in step S11 comprises including a sync sample table, such as 'stss' box, 8 comprising the information.

In an embodiment, including the information of the closest preceding IRAP sample in step S11 comprises including a sample group description 6 and/or a sample group 7 with grouping type 'rap' comprising the information.

In an embodiment, the sample group description is in the form of the 'sgpd' box and is also denoted RAP sample group description herein if the grouping type of the sample group description is 'rap'.

Corresponding, the sample group, sometimes referred to as sample to group, is in the form of the 'sbgp' box and is also denoted RAP sample group or RAP sample to group herein if the grouping type of the sample group is 'rap'.

In an embodiment the media container file is fragmented and including the information of the closest preceding IRAP sample in step S11 comprises including a track fragment run box comprising the information in a file fragment of the multiple file fragments.

The track fragment runt box may be present in a same file fragment as the sample group description and the sample group with grouping type 'drap' or in a previous file fragment. Thus, in such a case step S11 comprises including the track fragment box in same file fragment of the multiple file fragments as the sample group description and sample group with group type 'drap' or in a previous file fragment of the multiple file fragments.

A device for creating or generating a media container file is configured to include a sample group description and/or a sample group with grouping type 'drap' comprising information identifying a position of a DRAP sample within a bitstream of encoded pictures comprised in the media container file. The device is also configured to include, within the bitstream information in the media container file of a closest preceding IRAP sample given a position of the DRAP sample in the bitstream. The information enables identification of the closest preceding IRAP sample within the bitstream. The closest preceding IRAP sample is preferably a reference sample for the DRAP sample. The device is further configured to include the bitstream in the media container file.

In an embodiment, the device is configured to include the bitstream in one or more media data, 'mdat', boxes in the media container file.

In an embodiment, the device is configured to include a sync sample table box comprising the information of the closest preceding IRAP sample in the media container file.

In an embodiment, the device is configured to include, in the media container file, a sample group description and/or a sample group with grouping type 'rap' comprising the information of the closest preceding IRAP sample.

In an embodiment, the media container file is fragmented into multiple file fragments and the device is configured to include a track fragment run box comprising the information of the closest preceding IRAP sample in a file fragment of the multiple file fragments.

In an embodiment, the device is configured to include the track fragment run box in a same file fragment of the multiple file fragments as the sample group description and sample group with grouping type 'drap' or in a previous file fragment of the multiple file fragments.

The device may be implemented in hardware, software or a combination thereof as previously described herein or as a number of functional modules. A computer program may also be designed to create or generate a media container file.

Hence, the units shown in FIGS. 9-12 can be slightly modified to disclose the above described device suitable for creating or generating a media container file.

For instance, a device such as shown in FIG. 9 or 12 and applicable to the above defined embodiments would typically comprise a DRAP information creator configured to include a sample group description and/or a sample group with grouping type 'drap' comprising information identifying a position of a DRAP sample within a bitstream of encoded pictures comprised in the media container file. The device also comprises an IRAP information creator configured to include information in the media container file of a closest preceding IRAP sample within the bitstream. The device preferably also comprises a video creator configured to include the bitstream in the media container file.

The above three units thereby replaces the DRAP finder, IRAP finder and the video decoder of FIG. 9 or 12. The device may optionally also comprise the input unit and the output unit.

Figure 13:
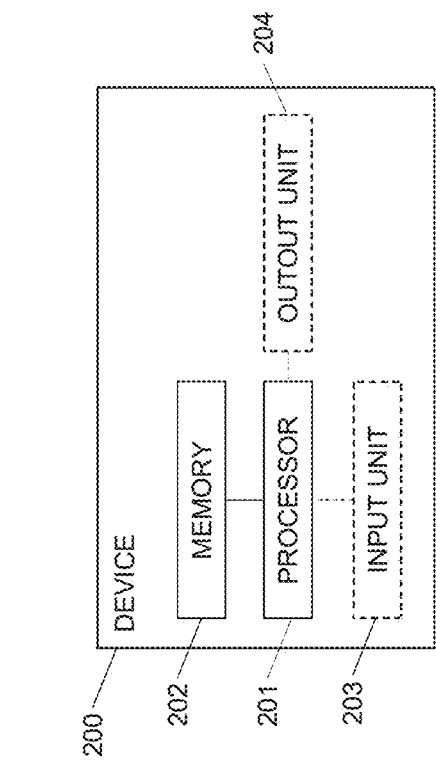
FIG. 13 is a schematic block diagram of a device for generating a media container file according to an embodiment.

Alternatively, the device may be implemented as shown in FIG. 13, i.e. comprising a processor 201 and a memory 202 and optionally and input and output units 203, 204. Thus, in this embodiment, the device 200 comprises a processor 201 and a memory 202 comprising instructions executable by the processor 201. The processor 201 is operative to include the sample group description and/or the sample group with grouping type 'drap' in the media container file. The processor 201 is operative to include the information of the closest preceding IRAP sample in the media container file. The processor 201 is operative to include the bitstream in the media container file.

Figure 14:
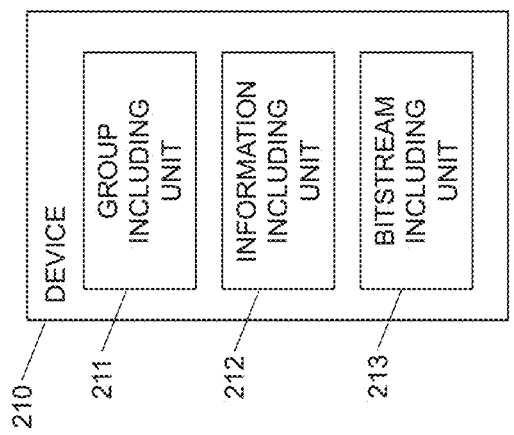
FIG. 14 is a schematic block diagram of a device for generating a media container file according to another embodiment.

FIG. 14 schematically illustrates a device 210 for creating or generating a media container file implemented with functional modules. The device 210 comprises a group including unit 211 for including a sample group description and/or a sample group with grouping type 'drap' comprising information identifying a position of a DRAP sample within a bitstream of encoded video content in the form of encoded pictures comprised in the media container file. The device 210 also comprises an information including unit 212 for including information in the media container file of a closest preceding IRAP sample within the bitstream given a position of the DRAP sample in the bitstream. The information enables identification of the closest preceding IRAP sample within the bitstream and the closest preceding IRAP sample is a reference sample for the DRAP sample. The device 210 further comprises a bitstream including unit 213 for including the bitstream in the media container file.

A further aspect of the embodiments relates to a computer program 340, see FIG. 12, comprising instructions, which when executed by a processor 310 cause the processor 310 to include a sample group description and/or sample group with grouping type 'drap' comprising information identifying a position of a DRAP sample within a bitstream of encoded video content in the form of encoded pictures comprised in the media container file. The processor 310 is also caused to include information in the media container file of a closest preceding IRAP sample within the bitstream given a position of the DRAP sample in the bitstream. The information enables identification of the closest preceding IRAP sample within the bitstream and the closest preceding IRAP sample is a reference sample for the DRAP sample. The processor 310 is further caused to include the bitstream in the media container file.

A media container file as described herein is preferably a container file according to the ISO base media file format as defined by the specification [2]. The media container file furthermore preferably meets corrigenda and amendments of the specification [2] including, among others, ISO/IEC 14496-12:2012/Amd 1:2013; ISO/IEC 14496-12:2012/Amd 2:2014; ISO/IEC 14496-12:2012/Amd 3:2015; ISO/IEC 14496-12:2012/Cor 1:2013; ISO/IEC 14496-12:2012/Cor 2:2014; ISO/IEC 14496-12:2012/Cor 3:2015; ISO/IEC 14496-12:2012/Cor 4:2015.

The device according to the embodiments and as shown in FIGS. 9, 10, 12-15 may be implemented in a network node or network device.

A network node may refer to base stations, access points, network control nodes such as network controllers, radio network controllers, base station controllers, access controllers, and the like. In particular, the term 'base station' may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

It is becoming increasingly popular to provide computing services, i.e. hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 17:
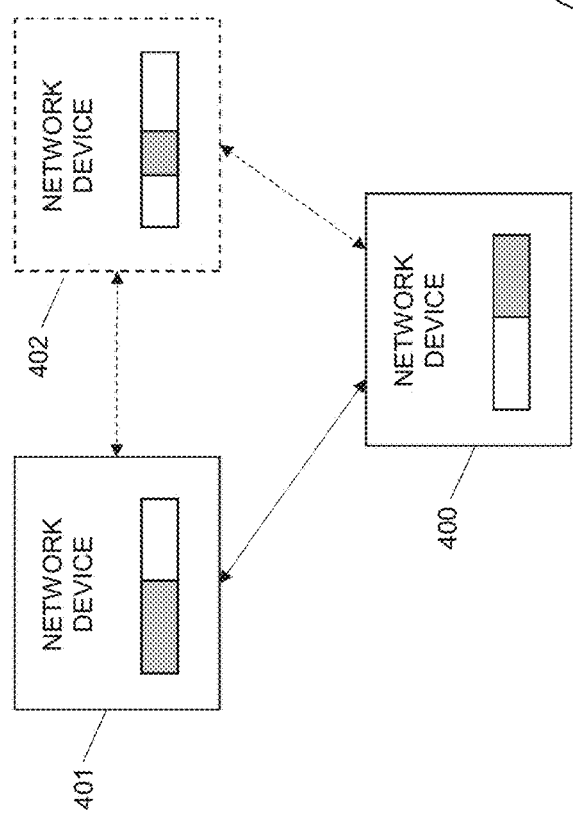
FIG. 17 schematically illustrate a distributed implementation of the embodiments among multiple network devices.

FIG. 17 is a schematic diagram illustrating an example of how functionality can be distributed or partitioned between different network devices in a general case. In this example, there are at least two individual, but interconnected network devices 400, 401, which may have different functionalities, or parts of the same functionality, partitioned between the network devices 400, 401. There may be additional network devices 402 being part of such a distributed implementation. The network devices 400, 401, 402 may be part of the same wireless communication system, or one or more of the network devices may be so-called cloud-based network devices located outside of the wireless communication system.

Figure 18:
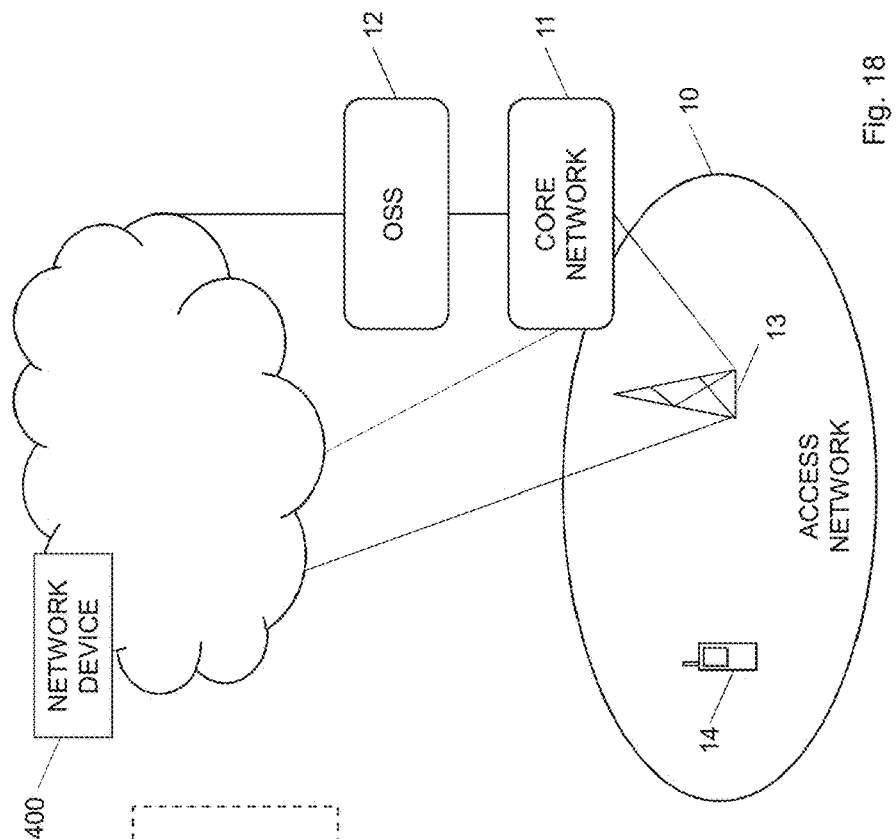
FIG. 18 is a schematic illustration of an example of a wireless communication system with one or more cloud-based network devices according to an embodiment.

FIG. 18 is a schematic diagram illustrating an example of a wireless communication system, including an access network 10 and/or a core network 11 and/or an Operations and Support System (OSS) 12 in cooperation with one or more cloud-based network devices 400. A network device 400 may generally be seen as an electronic device being communicatively connected to other electronic devices in the network.

By way of example, the network device 400 may be implemented in hardware, software or a combination thereof. For example, the network device 400 may be a special-purpose network device or a general purpose network device, or a hybrid thereof.

In an embodiment, the network device 400 comprises a device for decoding DRAP samples according to the embodiments and/or a device for generating a media container file according to the embodiments.

The figure also illustrates a network node 13 of the radio access network 10 and user device or equipment 14.

In another embodiment, the user equipment 14 comprises a device for decoding DRAP samples according to the embodiments and/or a device for generating a media container file according to the embodiments. The user equipment 14 could be in a computer, either stationary or portable, such as a laptop; a smart phone; a mobile telephone; a tablet; a set-top box; etc.

The embodiments described above are to be understood as a few illustrative examples of the present invention. It will be understood by those skilled in the art that various modifications, combinations and changes may be made to the embodiments without departing from the scope of the present invention.

In particular, different part solutions in the different embodiments can be combined in other configurations, where technically possible.

REFERENCES

[1] Joint Collaborative Team on Video Coding (JCT-VC) of ITU-T SG 16 WP 3 and ISO/IEC JTC 1/SC 29/WG11, 18$^{th}$ Meeting: Sapporo, J P, 30 Jun.-9 Jul. 2014, Document: JCTVC-R0059, HLS: Dependent RAP indication SEI message

[2] ISO/IEC 14496-12:2012 Information technology—Coding of audio-visual objects—Part 12: ISO base media file format

The invention claimed is:

1. A method for decoding dependent random access point (DRAP) samples, said method comprising:
   finding a DRAP sample in a media container file comprising a bitstream of encoded video content in the form of encoded pictures, wherein finding said DRAP sample comprises inspecting a DRAP sample group in said media container file to find said DRAP sample;
   finding a closest preceding, according to a decoding order, intra random access point (IRAP) sample in said media container file, wherein finding said closest preceding IRAP sample comprises finding and extracting an immediately preceding IRAP sample from said media container file;
   decoding said IRAP sample; and
   decoding said DRAP sample with said decoded IRAP sample as reference sample.

2. The method of claim 1, further comprising receiving a tune-in or seek request defining a desired tune-in or seek position within said media container file, wherein finding said DRAP sample comprises finding a DRAP sample in said media container file associated with said desired tune-in or seek position based on said tune-in or seek request.

3. The method of claim 2, wherein finding said associated DRAP sample comprises finding a closest preceding, according to said decoding order and relative to said tune-in or seek position, DRAP sample in said media container file based on said tune-in or seek request.

4. The method of claim 1, wherein finding and extracting said immediately preceding IRAP sample comprises inspecting a random access point, RAP, sample group in said media container file in order to retrieve information defining a position of said IRAP sample in said media container file.

5. The method of claim 1, wherein finding and extracting said immediately preceding IRAP sample comprises inspecting a sync sample table box in said media container file in order to retrieve information defining a position of said IRAP sample in said media container file.

6. The method of claim 1, wherein finding and extracting said immediately preceding IRAP sample comprises inspecting a current or previous track fragment run box in order to retrieve information defining a position of said IRAP sample in said media container file.

7. The method of claim 1, wherein finding said DRAP sample comprises:
   inspecting a list comprising information of sample type and/or sample property information; and
   identifying said DRAP sample as a sample indicated as DRAP sample in said list and that is closest to a desired tune-in or seek position; and
   finding said IRAP sample comprises inspecting said list to identify a sample indicated as IRAP sample in said list and that is closest to and preceding said identified DRAP sample.

8. A method of generating a media container file, said method comprising:
   including a sample group description and/or a sample group with grouping type 'drap' comprising information identifying a position of a dependent random access point (DRAP) sample within a bitstream of encoded video content in the form of encoded pictures comprised in said media container file;
   including information in said media container file of a closest preceding intra random access point (IRAP) sample within said bitstream given a position of said DRAP sample in said bitstream, said information enables identification of said closest preceding IRAP sample within said bitstream and said closest preceding IRAP sample is a reference sample for said DRAP sample; and
   including said bitstream in said media container file.

9. The method of claim 8, wherein including said information of said closest preceding IRAP sample comprises including a sync sample table box comprising said information of said closest preceding IRAP sample in said media container file.

10. The method of claim 8, wherein including said information of said closest preceding IRAP sample comprises including, in said media container file, a sample group description and/or a sample group with grouping type 'rap' comprising said information of said closest preceding IRAP sample.

11. The method of claim 8, wherein said media container file is fragmented into multiple file fragments and including said information of said closest preceding IRAP sample comprises including a track fragment run box comprising said information of said closest preceding IRAP sample in a file fragment of said multiple file fragments.

12. The method of claim 11, wherein including said track fragment run box comprises including said track fragment run box in a same file fragment of said multiple file fragments as said sample group description and sample group with grouping type 'drap' or in a previous file fragment of said multiple file fragments.

13. A non-transitory computer-readable medium comprising, stored thereupon, a media container file comprising:
a movie box comprising metadata of a presentation;
at least one media data box comprising a bitstream of encoded video content in the form of encoded pictures;
a sample table box comprising metadata related to samples in said media container file, wherein said sample table box comprises:
a sample group description box with grouping type equal to 'drap'; and
a sample group box with grouping type equal to 'drap', wherein said sample group description box with grouping type equal to 'drap' and said sample group box with grouping type equal to 'drap' comprise information allowing identification of one or more dependent random access point (DRAP) samples in said bitstream contained in said at least one media data box;
information allowing identification of a closest preceding intra random access point (TRAP) sample in said bitstream given a position of a DRAP sample in said bitstream, wherein said position of said DRAP sample in said bitstream is defined based on said information comprised in said sample group description box with grouping type equal to 'drap' and said sample group box with grouping type equal to 'drap'.

14. The non-transitory computer-readable medium of claim 13, further comprising:
a sample group description box with grouping type equal to 'rap'; and
a sample group box with grouping type equal to 'rap', wherein
said sample group description box with grouping type equal to 'rap' and said sample group box with grouping type equal to 'rap' comprise information allowing identification of IRAP samples in said bitstream contained in said at least one media data box, and
said information comprised in said sample group description box with grouping type equal to 'rap' and said sample group box with grouping type equal to 'rap' defines a closest preceding IRAP sample in said bitstream, given said position of said DRAP sample.

15. The non-transitory computer-readable medium of claim 14, wherein a closest preceding sample, relative to said position of said DRAP sample, in said sample group box with grouping type equal to 'rap' is marked as an IRAP picture in said bitstream.

16. The non-transitory computer-readable medium of claim 13, further comprising a sync sample table box comprising information enabling identification of said closest preceding IRAP sample in the bitstream given said position of said DRAP sample.

17. The non-transitory computer-readable medium of claim 16, wherein a closest preceding sample, relative to said position of said DRAP sample, in said sync sample table box is marked as an IRAP picture in said bitstream.

18. The non-transitory computer-readable medium of claim 13, wherein said media container file is fragmented into multiple file fragments, each file fragment of said multiple file fragments comprises:
a media data box comprising a part of said encoded video content of said bitstream;
a movie fragment box comprising metadata relating to said part of said encoded video content comprised in said media data box of said file fragment, said move fragment box comprises a track fragment run box comprising information enabling identification of positions of IRAP samples in said bitstream.

19. The non-transitory computer-readable medium of claim 18, wherein said information comprised in said track fragment box is in the form of a flag indicating whether an associated sample is an IRAP sample or not.

20. A device for decoding dependent random access point (DRAP) samples, wherein said device comprises a processing circuit configured to:
find a DRAP sample in a media container file comprising a bitstream of encoded video content in the form of encoded pictures, by inspecting a DRAP sample group in said media container file to find said DRAP sample;
find a closest preceding, according to a decoding order, intra random access point (IRAP) sample in said media container file, by finding and extracting an immediately preceding IRAP sample from said media container file;
decode said IRAP sample; and
decode said DRAP sample with said decoded IRAP sample as reference sample.

21. The device of claim 20, wherein the processing circuit is configured to:
receive a tune-in or seek request defining a desired tune-in or seek position within said media container file; and
find a DRAP sample in said media container file associated with said desired tune-in or seek position based on said tune-in or seek request.

22. The device of claim 21, wherein the processing circuit is configured to find a closest preceding, according to said decoding order and relative to said tune-in or seek position, DRAP sample in said media container file based on said tune-in or seek request.

23. The device of claim 20, wherein the processing circuit is configured to inspect a random access point, RAP, sample group in said media container file in order to retrieve information defining a position of said IRAP sample in said media container file.

24. The device of claim 20, wherein the processing circuit is configured to inspect a sync sample table box in said media container file in order to retrieve information defining a position of said IRAP sample in said media container file.

25. The device of claim 20, wherein the processing circuit is configured to inspect a current or previous track fragment run box in order to retrieve information defining a position of said IRAP sample in said media container file.

26. The device of claim 20, wherein the processing circuit is configured to:
- find the DRAP sample by inspecting a list comprising information of sample type and/or sample property information, and identifying said DRAP sample as a sample indicated as DRAP in said list and that is closest to a desired tune-in or seek position; and
- find said IRAP sample by inspecting said list to identify a sample indicated as IRAP sample in the list and that is closest to and preceding said identified DRAP sample.

27. A device for generating a media container file, said device comprising a processing circuit configured to:
- include a sample group description and/or a sample group with grouping type 'drap' comprising information identifying a position of a dependent random access point (DRAP) sample within a bitstream of encoded video content in the form of encoded pictures comprised in said media container file;
- include information in said media container file of a closest preceding intra random access point (IRAP) sample within said bitstream given a position of said DRAP sample in said bitstream, said information enables identification of said closest preceding IRAP sample within said bitstream and said closest preceding IRAP sample is a reference sample for said DRAP sample; and
- include said bitstream in said media container file.

28. The device of claim 27, wherein said processing circuit is configured to include a sync sample table box comprising said information of said closest preceding IRAP sample in said media container file.

29. The device of claim 28, wherein said processing circuit is configured to include, in said media container file, a sample group description and/or sample group with grouping type 'rap' comprising said information of said closest preceding IRAP sample.

30. The device of claim 27, wherein said media container file is fragmented into multiple file fragments and said processing circuit is configured to include a track fragment run box comprising said information of said closest preceding IRAP sample in a file fragment of said multiple file fragments.

31. The device of claim 30, wherein said processing circuit is configured to include said track fragment run box in a same file fragment of said multiple file fragments as said sample group description and sample group with grouping type 'drap' or in a previous file fragment of said multiple file fragments.

* * * * *

UNITED STATES PATENT AND TRADEMARK OFFICE
CERTIFICATE OF CORRECTION

Page 1 of 1

PATENT NO. : 10,136,153 B2
APPLICATION NO. : 14/900649
DATED : November 20, 2018
INVENTOR(S) : Pettersson et al.

It is certified that error appears in the above-identified patent and that said Letters Patent is hereby corrected as shown below:

In the Drawings

In Fig. 11, Sheet 8 of 11, insert Main Designator -- 300 --, therefor.

In the Specification

In Column 7, Line 15, delete "overview a" and insert -- overview of a --, therefor.

In Column 27, Line 39, delete "seguence" and insert -- sequence --, therefor.

In Column 29, Line 61, delete "'tlhd'," and insert -- 'thfd', --, therefor.

In the Claims

In Column 35, Line 42, in Claim 13, delete "(TRAP)" and insert -- (DRAP) --, therefor.

Signed and Sealed this
Sixteenth Day of April, 2019

Andrei Iancu
*Director of the United States Patent and Trademark Office*